(12) United States Patent
Sardet et al.

(10) Patent No.: US 12,320,440 B2
(45) Date of Patent: Jun. 3, 2025

(54) ROTARY DISC VALVE

(71) Applicant: CIRCOR Industria SAS, Le Plessis-Trévise (FR)

(72) Inventors: Francois Sardet, Combs la Ville (FR); Patrice Ridal, Limeil-Brévannes (FR); Damien Bourdin, Yerres (FR)

(73) Assignee: CIRCOR Industria SAS, Le Plessis-Trévise (FR)

( * ) Notice: Subject to any disclaimer, the term of this patent is extended or adjusted under 35 U.S.C. 154(b) by 34 days.

(21) Appl. No.: 18/405,167

(22) Filed: Jan. 5, 2024

(65) Prior Publication Data

US 2024/0247724 A1 Jul. 25, 2024

Related U.S. Application Data

(60) Provisional application No. 63/439,909, filed on Jan. 19, 2023.

(51) Int. Cl.

| | |
|---|---|
| *B64B 1/64* | (2006.01) |
| *F16K 3/02* | (2006.01) |
| *F16K 3/08* | (2006.01) |
| *F16K 3/10* | (2006.01) |
| *F16K 3/316* | (2006.01) |
| *F16K 31/528* | (2006.01) |

(Continued)

(52) U.S. Cl.
CPC .................. *F16K 3/08* (2013.01); *B64B 1/64* (2013.01); *F16K 3/0254* (2013.01); *F16K 3/085* (2013.01); *F16K 3/10* (2013.01); *F16K 3/316* (2013.01); *F16K 31/5282* (2013.01); *F16K 31/5286* (2013.01); *F16K 31/535* (2013.01); *B64B 1/62* (2013.01)

(58) Field of Classification Search
CPC .... F16K 3/08; F16K 3/0254; F16K 3/20–205; F16K 3/316; F16K 3/10; F16K 31/52475; F16K 31/535; F16K 3/085; F16K 51/02; F16K 31/52; F16K 31/5282; F16K 31/5286; F16K 1/24; B64B 1/64; B64B 1/62

See application file for complete search history.

(56) References Cited

FOREIGN PATENT DOCUMENTS

| EP | 0344584 B1 | 8/1993 |
| EP | 3056780 A1 | 8/2016 |

(Continued)

OTHER PUBLICATIONS

Extended European Search Report for EP Application No. 24151854. 7, dated Jun. 7, 2024, 6 pages.

*Primary Examiner* — Marina A Tietjen
(74) *Attorney, Agent, or Firm* — KDW Firm PLLC

(57) ABSTRACT

A rotary disc valve includes a guide assembly having a ring-shaped member having a groove disposed in an inner surface thereof, and a valve disc assembly rotatably coupled to the guide assembly. The valve disc assembly includes a valve disc, a projection received within the groove of the guide assembly, and a chimney support coupled to the guide assembly. The chimney support includes a seal member for selectively sealing against the valve disc. The groove has a main portion perpendicular to a longitudinal axis of the rotary disc valve, and an angled portion at an oblique angle with respect to the longitudinal axis. When the valve is moved between a closed and open positions the valve disc assembly is rotated and moves the projection along the angled portion of the groove, thereby moving the valve disc toward and away from the seal.

15 Claims, 30 Drawing Sheets

(51) Int. Cl.
*F16K 31/53* (2006.01)
*B64B 1/62* (2006.01)

(56) References Cited

FOREIGN PATENT DOCUMENTS

| | | |
|---|---|---|
| GB | 706371 A | 3/1954 |
| GB | 874169 A | 8/1961 |
| WO | 2013073039 A1 | 5/2013 |

ROTARY DISC VALVE

CROSS-REFERENCE TO RELATED APPLICATIONS

This is a Nonprovisional Patent Application of U.S. Provisional Application Ser. No. 63/439,909, filed Jan. 19, 2023, the entirety of which provisional application is incorporated herein.

FIELD OF THE DISCLOSURE

The present disclosure relates generally to rotary valves, and in particular to rotary valves for use in pressure relief applications.

BACKGROUND OF THE DISCLOSURE

Various valve types are known and used in gas handling applications. Such valves include flap gate valves, butterfly valves, guillotine valves, ball valves, and the like. For applications in which the valves are used to relieve gas from a gas-containing structure, such as during pressure relief operations, these valve types suffer from a variety of disadvantages.

For example, when such valve types are used in applications in which the valves need to relieve gas to an outdoor environment, outward facing flap valves can suffer from the disadvantage that the flap is subjected to the force of wind (which, for example, in high altitude applications can approach or exceed 100 km/h). In such cases the high wind forces can twist and/or damage the flap. Using an inwardly oriented flap in such applications would solve the problem of flap damage but would undesirably require a fluid passage diameter of three or more times larger than an outward facing flap valve. In either case, a large structure would be required to take up the overhang of the valve (assuming a translation of 200 mm or more), and the associated motor would be in the fluid flow path, which is not acceptable. Alternatively, a motor located away from the valve would involve a large overhang, which is also not acceptable. Such geometries also require a structure to withstand the operating forces, which increases the overall mass of the valve.

It would be advantageous to provide an improved valve for use in gas relief applications. Such a valve should address the above-noted deficiencies in conventional designs.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

A rotary valve is disclosed for use in gas pressure relief applications. In one example embodiment the rotary valve is used to relieve internal helium pressures in an airship in the case of an overpressure condition within the helium-containing structure of the airship. In some embodiments the rotary valve is a safety valve used to relieve the pressure differential between internal helium pressure and the external ambient pressure as the airship rises.

A rotary valve is disclosed in which frictional opening forces are eliminated during rotation of the valve. Such a rotary valve includes a rotary disc that is guided within the external valve support structure, and a docking ramp that causes an axial translation of the rotating disc to compress the rotary disc against a seal when the valve is in the closed position to ensure a gas-tight seal exists when the valve is in the closed position. In the opening phase, the kinematics of the ramp allow the rotary disc to be axially displaced away the seal so that the disc can be rotated to the open configuration (and then back to the closed configuration) without engaging the seal, thus eliminating friction between the two during cycling of the valve.

Rotation of the rotary disc is obtained by the action of a motor that, via a pinion and worm connection, engages teeth on an outside surface of the rotary disc assembly. Axial translation of the rotary disc occurs by means of a radial guide groove formed in the valve housing, and within which one or more projections provided in the rotary disc assembly are received. The radial guide grooves are inclined at discrete locations (e.g., near the end of the rotational cycle) to axially move the rotary disc into and out of engagement with the valve seal.

The groove/projection interaction thus induce a complex movement to the rotary disc. Thus, as the valve is being cycled from the closed configuration to the open configuration, the projections of the rotary disc assembly ride within an inclined portion of the groove, which thereby moves the rotary disc outward and decompresses the seal. The remainder of the valve movement to the fully open configuration is unimpeded by any frictional contact with the seal. by following the rotation and by contact with the profile of these grooves, the rotary disc is pushed outwards and decompresses the seal. A reverse movement transitions the rotary valve from the fully open configuration to the closed configuration.

The arrangement of the rotary valve avoids wind entrapment and reduces aerodynamic stresses. The reduction in such stresses allows the mass of the rotary valve and any associated equipment to be reduced. Further, by locating the valve motor on the periphery of the valve, access for repairs is simplified, and the suspended mass associated with the valve is reduced.

Additional advantages to the disclosed rotary valve include reduced size and weight, improved design and operation, more precise control, improved maintenance, and improved robustness, as compared to conventional designs.

A rotary disc valve includes a guide assembly having a ring-shaped member with a groove disposed in an inner surface thereof, and a valve disc assembly rotatably coupled to the guide assembly. The valve disc assembly includes a valve disc, a projection received within the groove of the guide assembly, and a chimney support coupled to the guide assembly. The chimney support includes a seal member for selectively sealing against the valve disc. The groove has a main portion oriented perpendicular to a longitudinal axis of the rotary disc valve, and an angled portion oriented at an oblique angle with respect to the longitudinal axis.

When the rotary disc valve is moved from a closed position toward an open position the valve disc assembly is rotated in a first direction with respect to the guide assembly, which moves the projection along the angled portion of the groove, thereby moving the valve disc away from the seal to decompress the seal. When the valve disc assembly is moved from the open position to the closed position the valve disc assembly is rotated in a second direction with respect to the guide assembly, which moves the projection along the angled portion of the groove, thereby moving the valve disc toward the seal to compress the seal.

In some embodiments the angled portion of the groove is positioned adjacent to a first end of the groove. The main portion of the groove is positioned between the angled portion and a second end of the groove.

When the rotary disc valve is in the closed position the seal engages the valve disc, and wherein when the rotary disc valve is in the open position the seal is disposed a distance "D" away from the valve disc. In some embodiments the distance "D" is about 14 millimeters.

In some embodiments the rotary disc valve includes a skirt support coupled to the guide assembly, the skirt support configured to couple the rotary disc valve to surrounding structure.

In some embodiments the rotary disc valve includes a chimney support coupled to the guide assembly, the chimney support having an open portion and a solid portion. When the valve is in the open position the open portion of the chimney support aligns with an open portion of the valve disc, and when the valve is in the closed position the solid portion of the chimney support aligns with a solid portion of the valve disc. The open portion of the chimney support is D-shaped, and the seal is a D-shaped member coupled to the chimney support around the perimeter of the D-shaped open portion.

In embodiments the rotary disc valve can include a motor coupled to the chimney support. The motor includes a rotatable pinion. The valve disc assembly includes a plurality of gear parts, each of the plurality of gear parts having external teeth for engaging the rotatable pinion so that when the motor turns in a first direction the pinion engages the teeth to move the valve disc assembly in a first direction to open the valve. When the motor turns in a second direction the pinion engages the teeth to move the valve disc assembly in a second direction to close the valve.

In some embodiments the external teeth of the gear parts have first and second lateral portions. When the rotary disc valve is in the closed position the pinion engages the first lateral portions of the external teeth. When the rotary disc valve is in the open position the pinion engages the second lateral portions of the external teeth.

In some embodiments the guide assembly includes a recess for receiving a portion of the pinion when the pinion is engaged with the first lateral portions of the external teeth. The rotary disc valve can include a sensor configured to sense a position of the valve disc assembly and for signaling the motor to stop rotating the pinion when the rotary disc valve is determined by the sensor to have moved from the closed position to the fully open position. The sensor can be configured to signal the motor to stop rotating the pinion when the rotary disc valve is determined by the sensor to have moved from the closed position to the fully open position.

BRIEF DESCRIPTION OF THE DRAWINGS

By way of example, a specific embodiment of the disclosed device will now be described, with reference to the accompanying drawings, in which.

Figure 1:
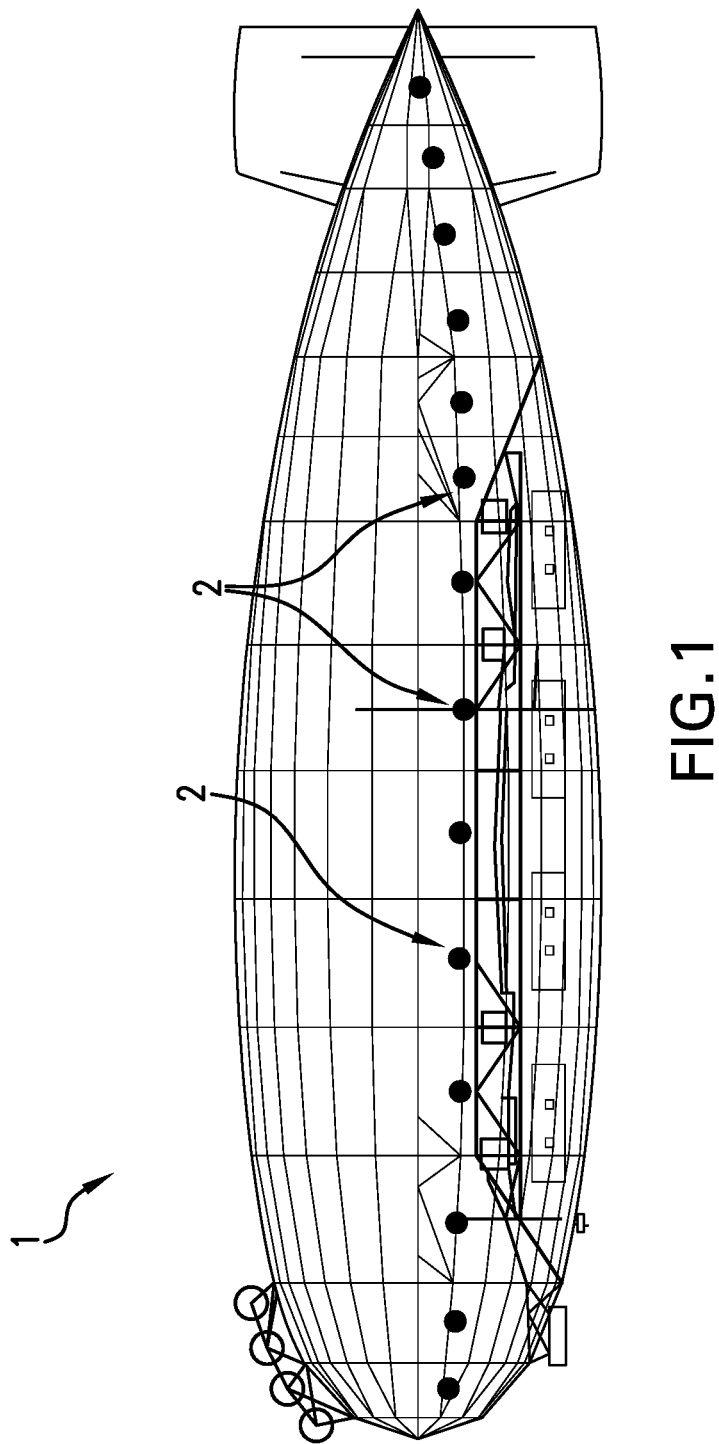
FIG. 1 is a schematic view of an example airship for use with the disclosed valve.

The drawings are not necessarily to scale. The drawings are merely representations, not intended to portray specific parameters of the disclosure. The drawings are intended to depict example embodiments of the disclosure, and therefore are not to be considered as limiting in scope. In the drawings, like numbering represents like elements.

DETAILED DESCRIPTION

Numerous embodiments of an improved rotary valve in accordance with the present disclosure will now be described more fully hereinafter with reference to the accompanying drawings, in which preferred embodiments of the present disclosure are presented. The systems of the present disclosure may, however, be embodied in many different forms and should not be construed as being limited to the embodiments set forth herein. Rather, these embodiments are provided so that this disclosure will convey certain example aspects of rotary valves to those skilled in the art. In the drawings, like numbers refer to like elements throughout unless otherwise noted.

This disclosure relates to rotary disc valves comprising a housing defining at least one passage for fluid to be controlled by the valve and a rotatable valve disc having an opening that can be brought into and out of alignment with a fluid flow passage through rotation of the disc within its own plane. The disclosure includes an arrangement in which the disc is axially shifted away from the seal as the valve is moved from the closed position to the open position to as to reduce or eliminate frictional forces associated with rotating the disc.

Referring now to FIG. 1, an example airship 1 is shown incorporating a plurality of rotary disc valves 2 according to the disclosure. As previously mentioned, the rotary disc valves 2 are used to relieve internal helium pressure in the airship 1 as the airship ascends and ambient pressures decrease. To adjust the pressure differential between the helium within the airship 1 and the ambient air as the airship ascends, a control system (not shown) opens one or more of the rotary disc valves 2 to allow helium to be discharged to the atmosphere. The control system then closes the rotary disc valves 2 when a desired reduced helium pressure within the airship is achieved.

Figure 2:
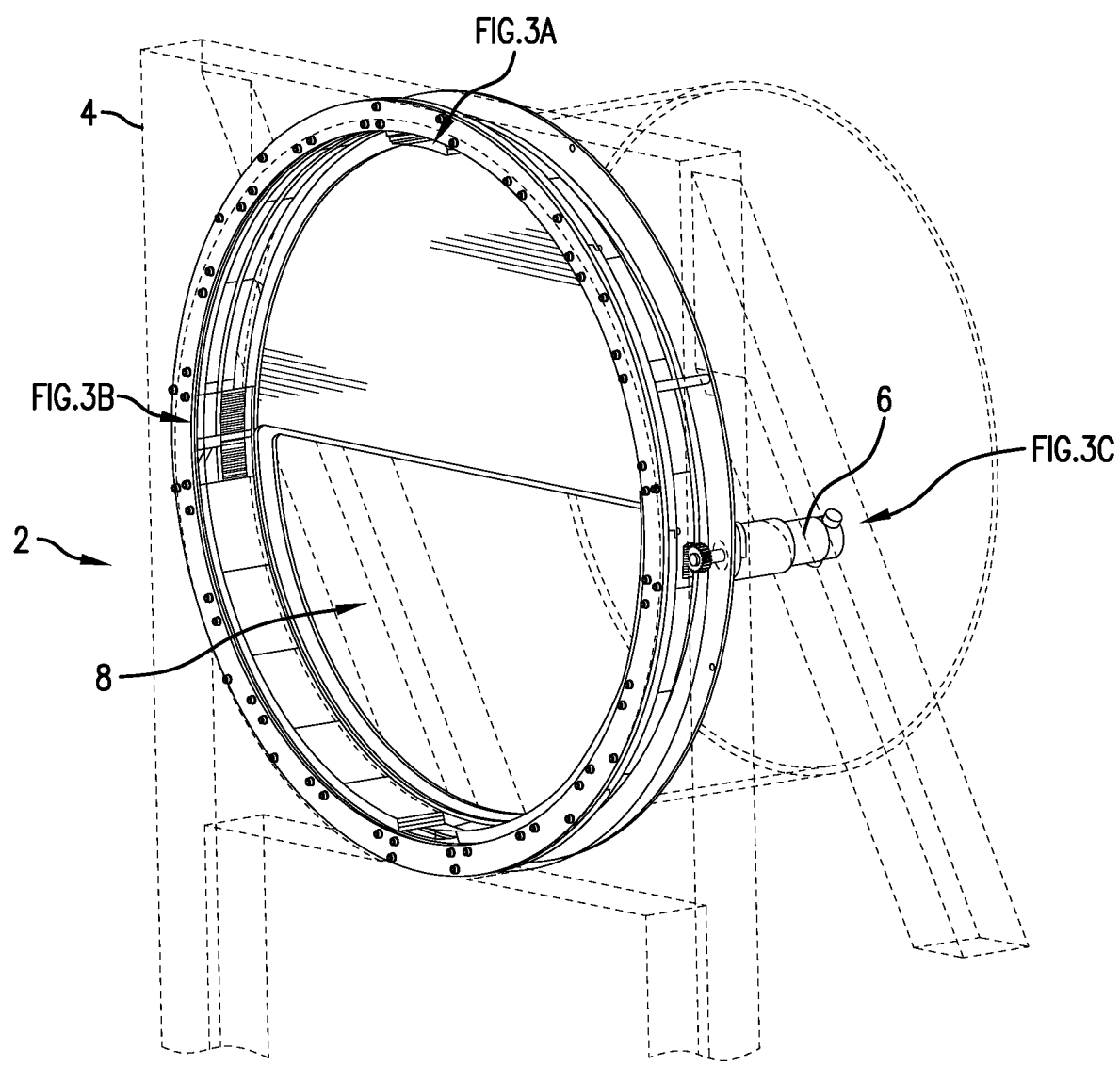
FIG. 2 is an isometric view of a rotary valve in accordance with the present disclosure installed in a portion of the airship of FIG. 1.

FIG. 2 illustrates the rotary disc valve 2 and related supporting structure 4, along with motor 6 which can be seen positioned at a periphery of the valve. The rotary disc valve 2 is shown in the open configuration such that an opening 8 in the disc is aligned to allow flow through the valve.

Figure 3A:
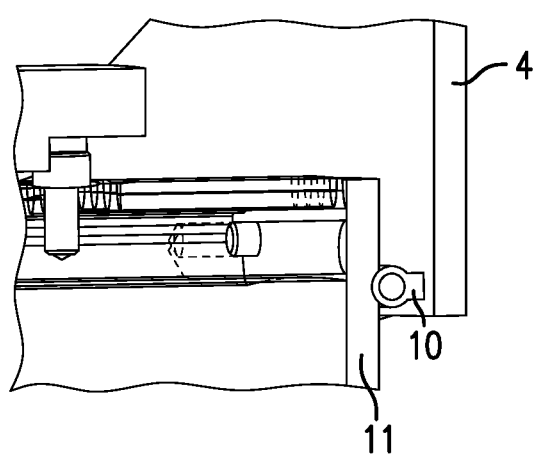
FIGS. 3A-3C are detail views of aspects of the rotary valve of FIG. 2.
Figure 3B:
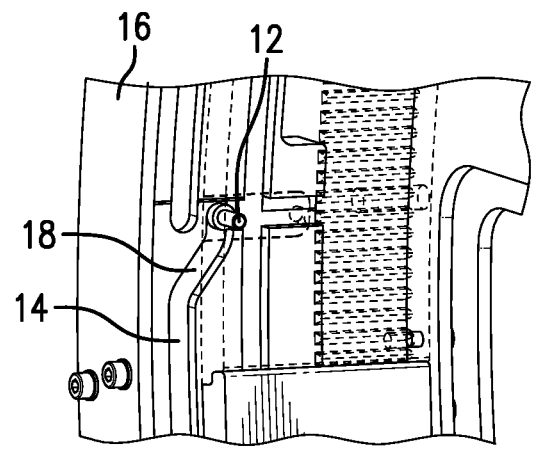
Figure 3C:
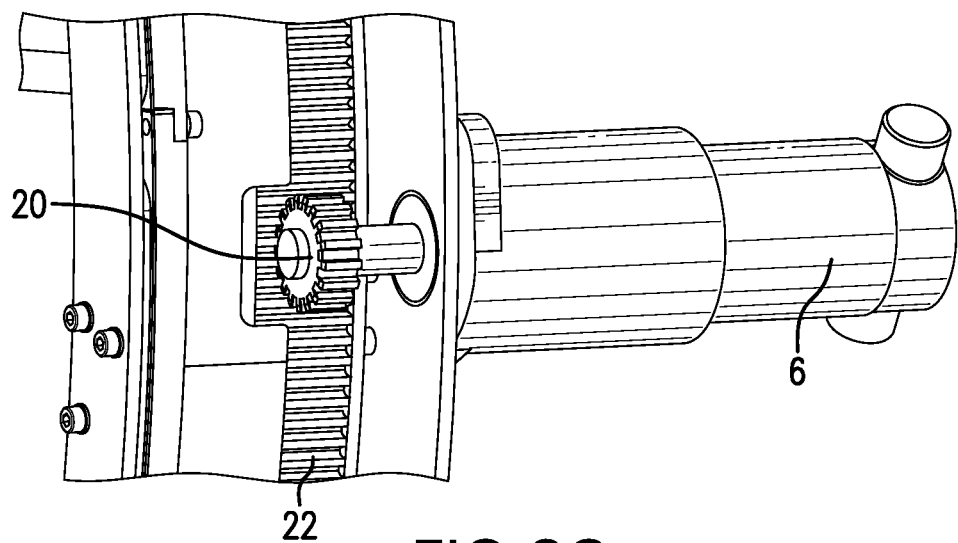

FIGS. 3A-3C show various details of the rotary disc valve 2 shown in FIG. 2. Specifically, FIG. 3A shows the position of seal 10 which seals between the supporting structure 4 (which in one embodiment is chimney support 28—see FIG. 10C) and the valve disc 11. FIG. 3B shows the projection 12 associated with the valve disc 11 positioned within groove 14 associated with the valve body 16. As will be described in greater detail later, as the valve disc 1 rotates, the projection 12 rides within the angled portion 18 of the groove 14, and the projection 12 and valve disc 11 move axially with respect to the valve body 16 and the seal 10. This axial movement serves to decompress the seal and allows the valve disc 11 to rotate unimpeded by frictional forces associated with engagement between the valve disc 11 and the seal 10. FIG. 3C shows the inter-engagement between a pinion 20 of the motor 6 and external gear teeth 22 disposed on a periphery of the valve disc assembly.

Figure 4:
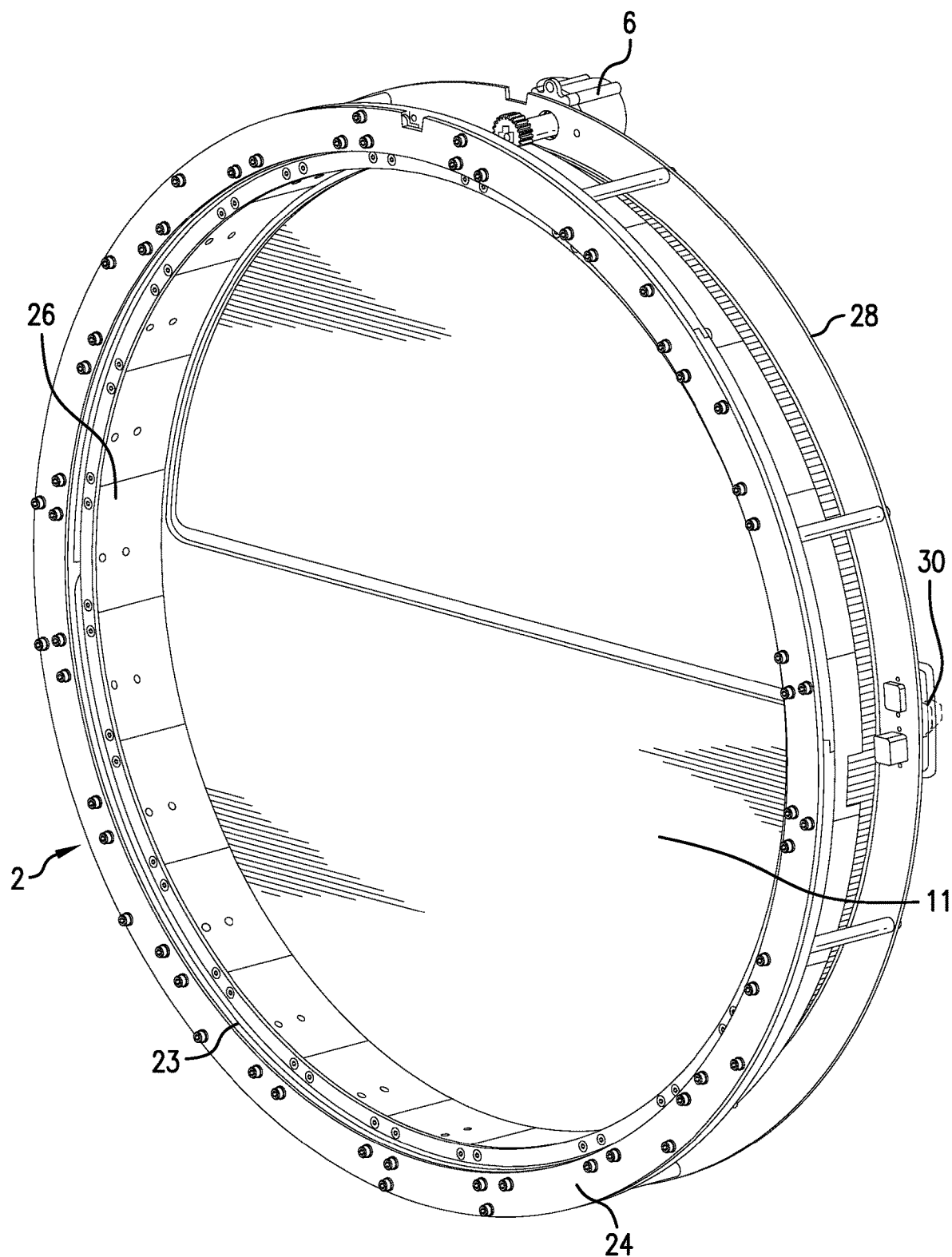
FIG. 4 is an isolated isometric view of the rotary valve of FIG. 2.
Figure 5:
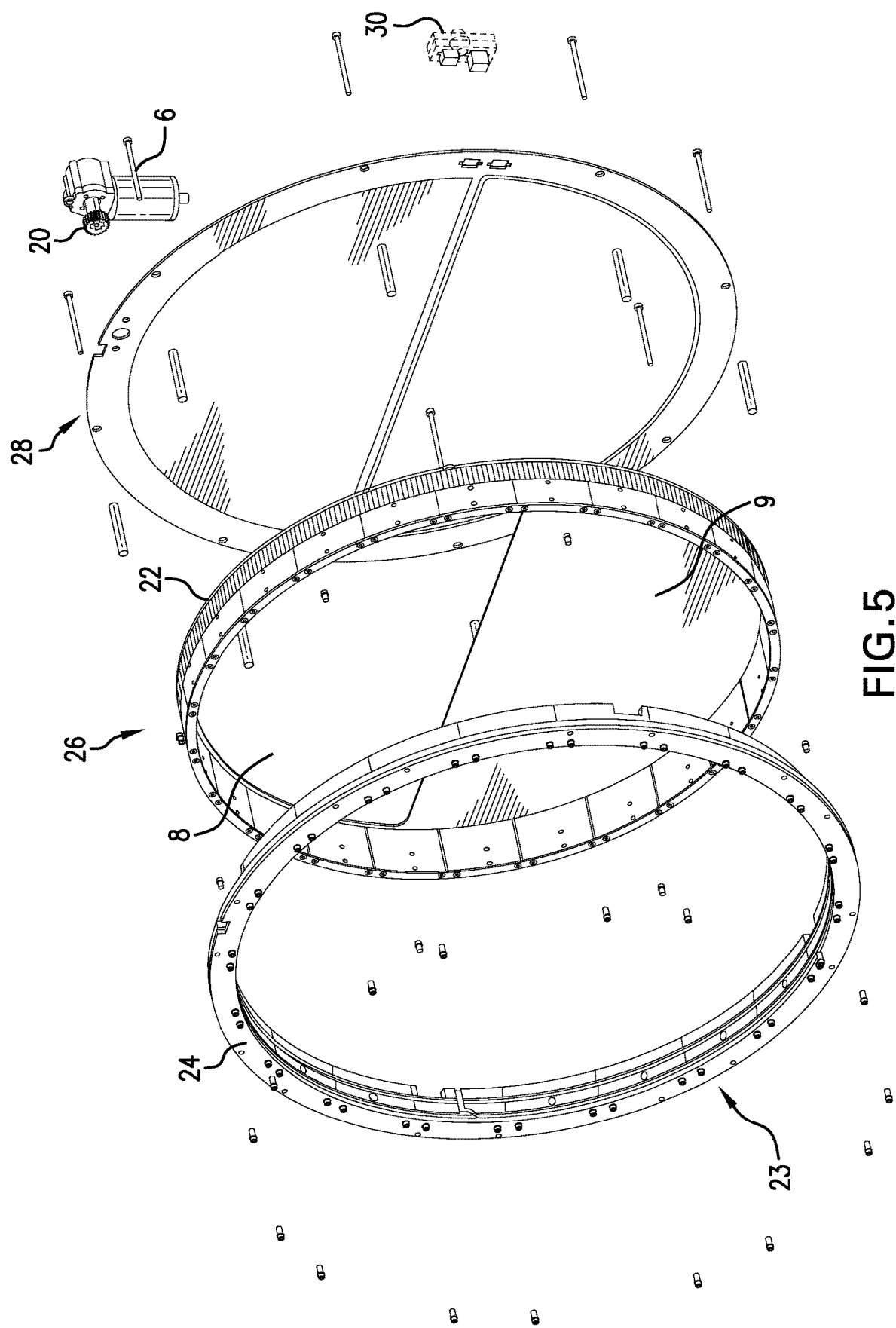
FIG. 5 is an exploded view of the rotary valve of FIG. 4.

FIGS. 4 and 5 shows the rotary disc valve 2 including guide assembly 23 and skirt support 24, valve disc assembly 26, and chimney support 28. Motor 6 is shown coupled to the chimney support 28 such that pinion 20 engages gear teeth 22 on the periphery of the valve disc assembly 26. Switch assembly 30 (the function of which will be described in greater detail later) is also shown coupled to the chimney support 28.

Figure 6A:
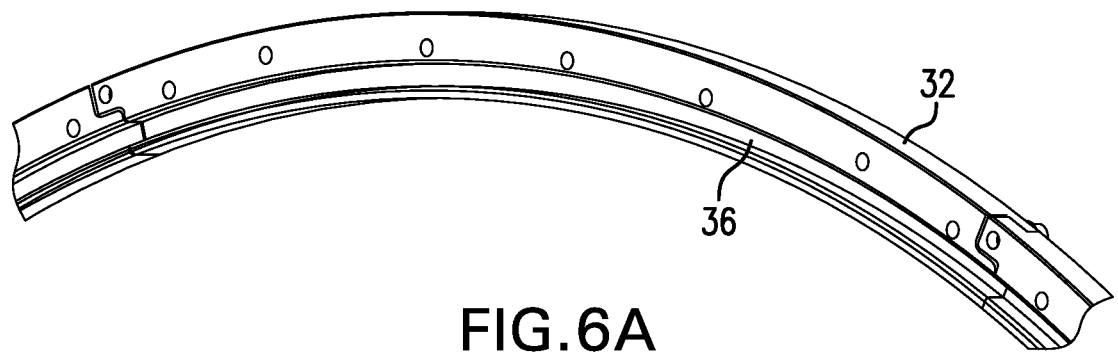
FIGS. 6A-6C are detail views of a skirt support portion of the rotary valve of FIG. 4.
Figure 6B:
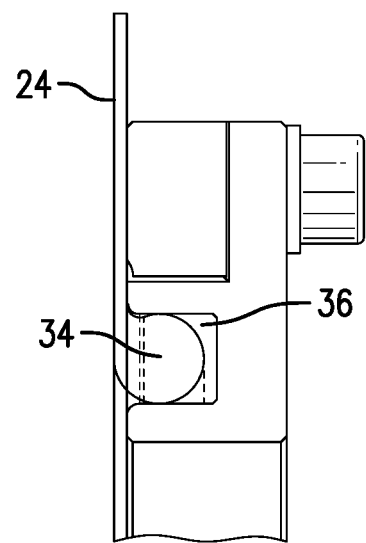
Figure 6C:
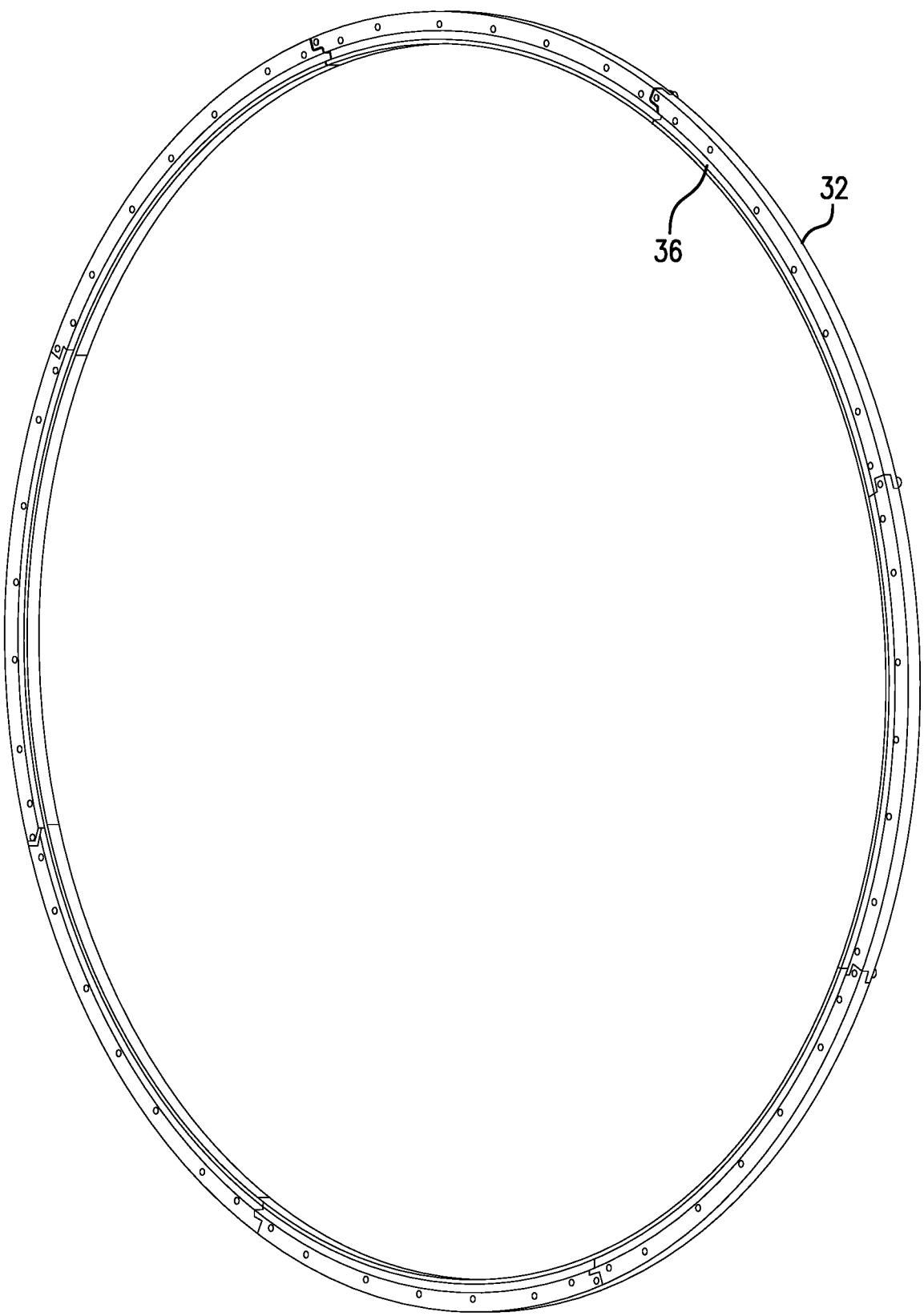

FIGS. 6A-6C illustrate aspects of the skirt support 24 and associated internal support ring 32. The skirt support 24 has a solid ring-shaped projection portion 34 which engages a recess 36 formed in the inner support ring 32 to hold the two together. The inner support ring 32 is shown as formed from a series of arc-shaped segments coupled together to form the ring. The skirt support 24 also serves as a mechanical interface with support structure associated with the airship 1.

Figure 7A:
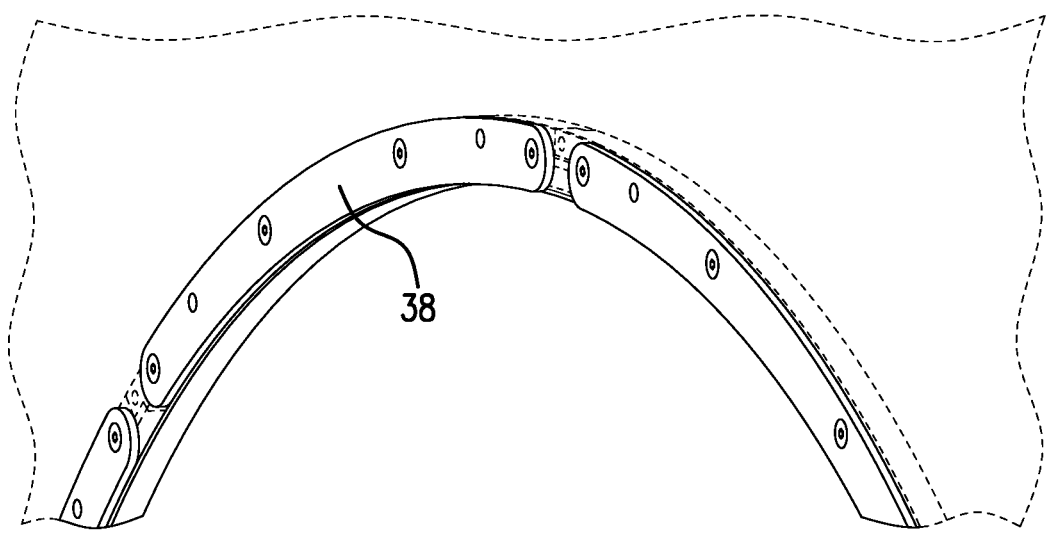
FIGS. 7A-7C are detail views of the skirt support portions and external support ring of the rotary valve of FIG. 4.
Figure 7B:
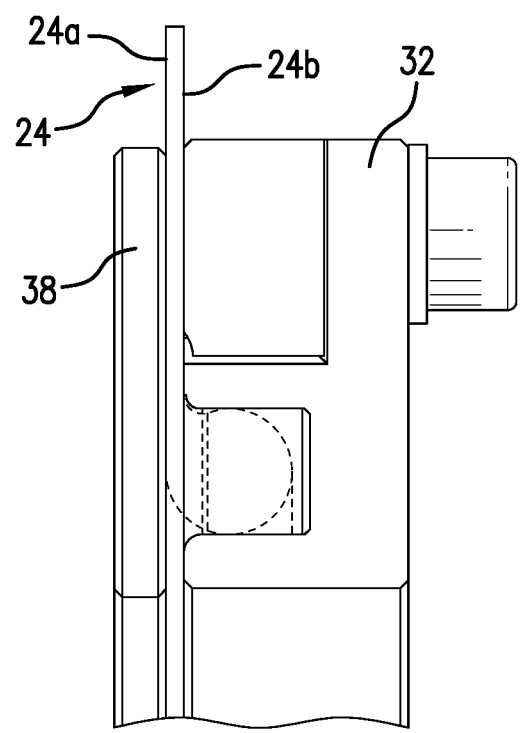
Figure 7C:
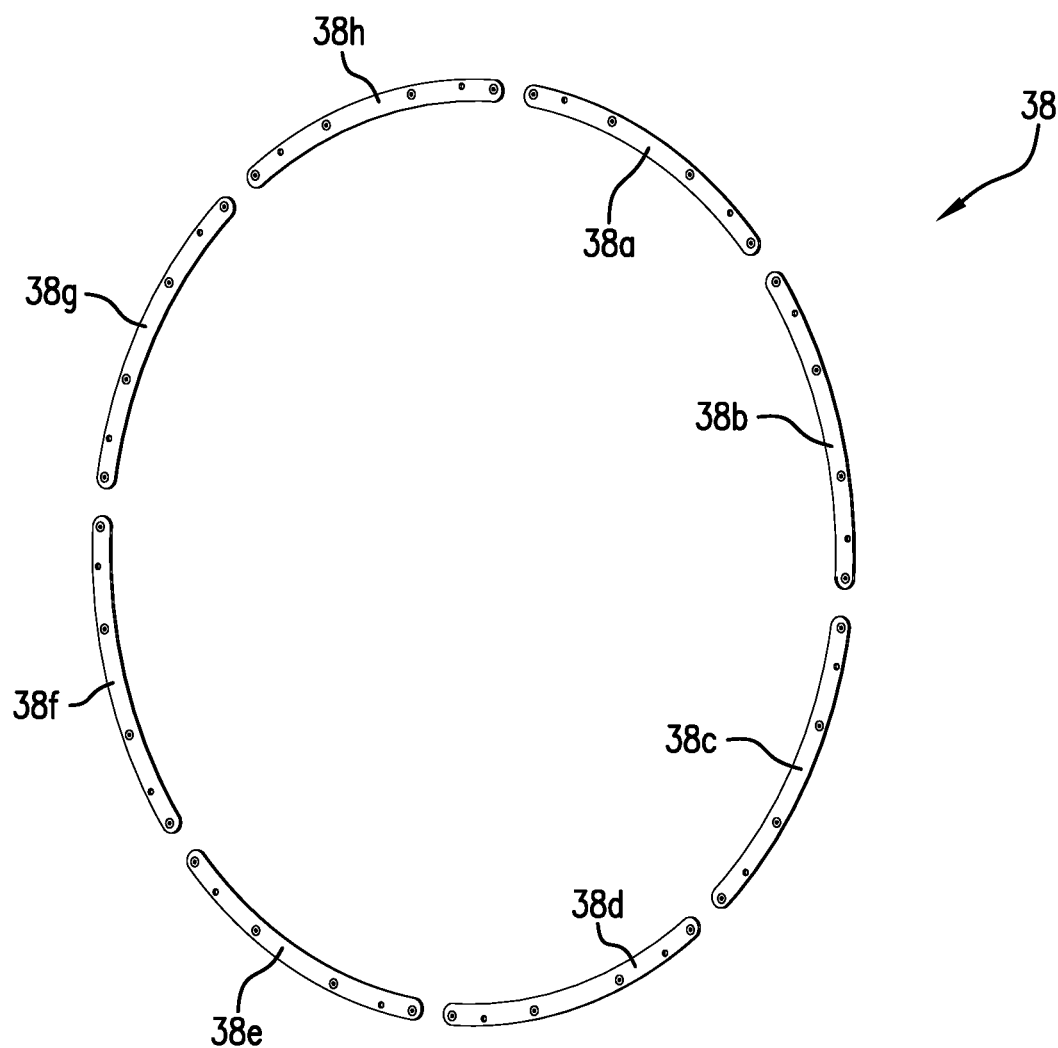

FIGS. 7A-7C illustrate the skirt support 24 and internal support ring 32 coupled to an external support 38. As can be seen, the external support 38 comprises a plurality of arc-shaped segments 38a-h which together form a ring shape. The arc-shaped segments 38a-h engage a first face 24a of the skirt support 24, while the internal support ring 32 engages a second face 24b of the skirt support. Thus arranged, the skirt support 24 is fixed between the internal support ring 32 and the external support 38.

Figure 8A:
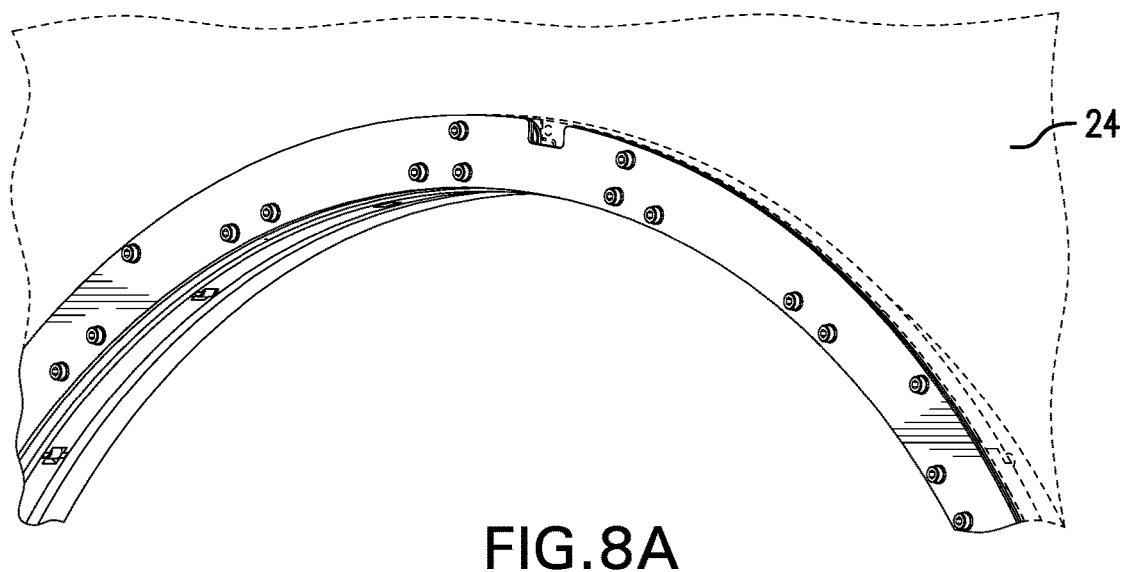
FIGS. 8A-8C are detail views of a guiding portion with the external support ring and skirt support portion of the rotary valve of FIG. 4.
Figure 8B:
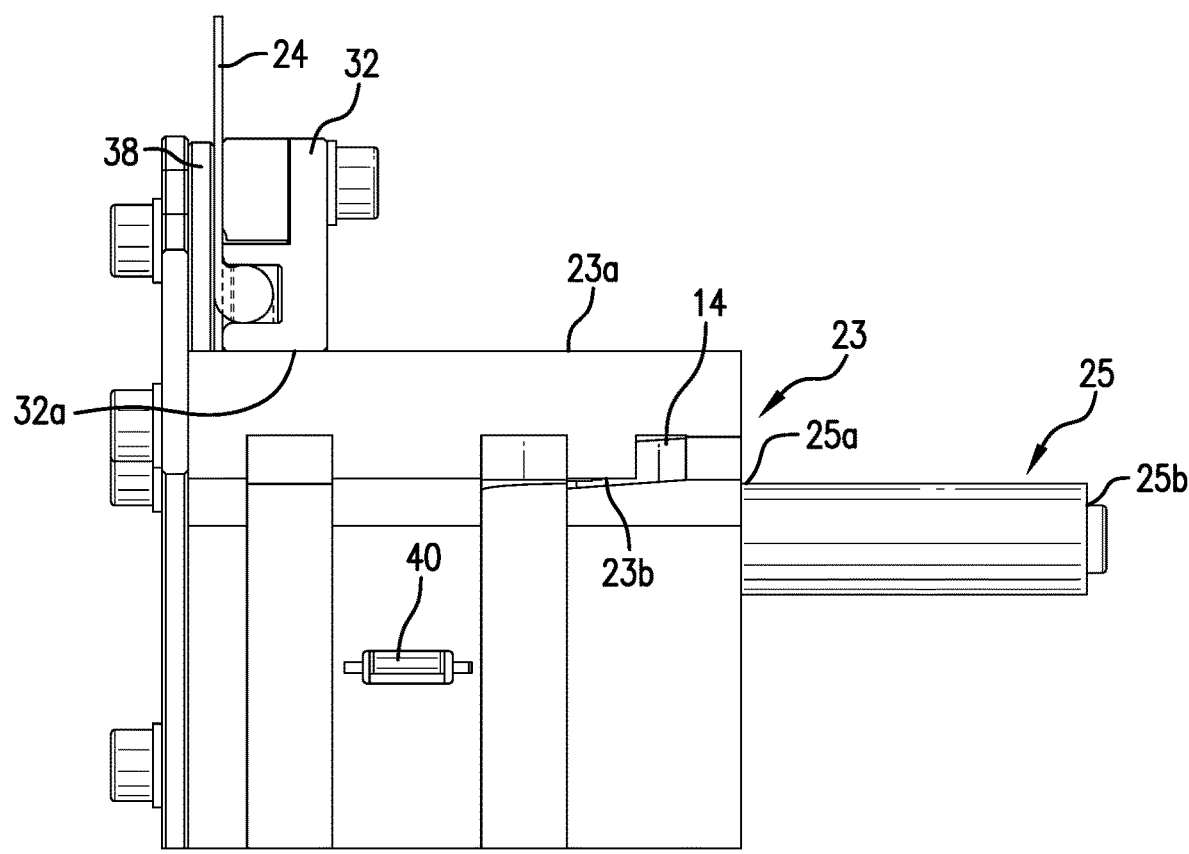
Figure 8C:
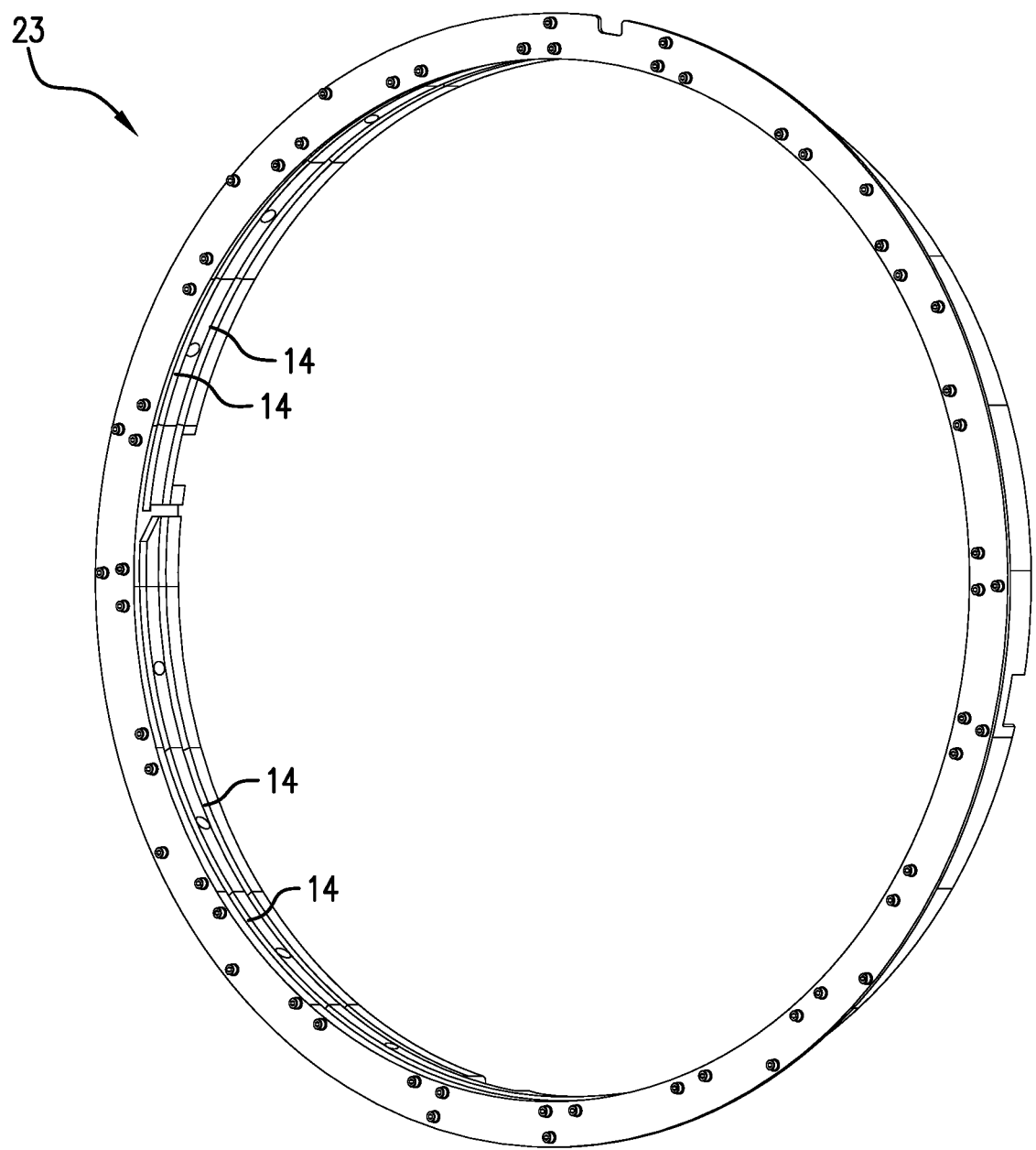

FIG. 8A-8C show the guide assembly 23 engaged with the internal support ring 32, skirt support 24, and external support 38. The guide assembly 23 is a ring-shaped member having an outer surface 23a and an inner surface 23b. The outer surface 23a abuts an inner surface 32a of the internal support ring 32, while the inner surface 23b includes a plurality of grooves 14 that guide the rotational movement of the valve disc assembly 26 via their interaction with projections 12. A plurality of rollers 40 are embedded in the inner surface 32a of the internal support ring 32. These rollers 40 are configured to engage the valve disc assembly 26 to facilitate a smooth rotation of the valve disc assembly. A spacer 25 is coupled to the guide assembly 23. The spacer 25 in the illustrated arrangement is a cylindrical member coupled at a first end 25a to the guide assembly 23. The second end 25b extends away from the guide assembly and is coupleable to a chimney support (see FIG. 10B). FIG. 8C shows the grooves 14 disposed in the inner surface 23b of the guide assembly 23. These grooves 14 interact with the associated projections 12 to hold the valve disc 11 in place and importantly to allow the valve disc assembly 26 to translate to release the engagement between the valve disc 11 and the seal 10 and to guide the valve disc assembly 26 as it rotates between the open and closed positions.

Figure 9A:
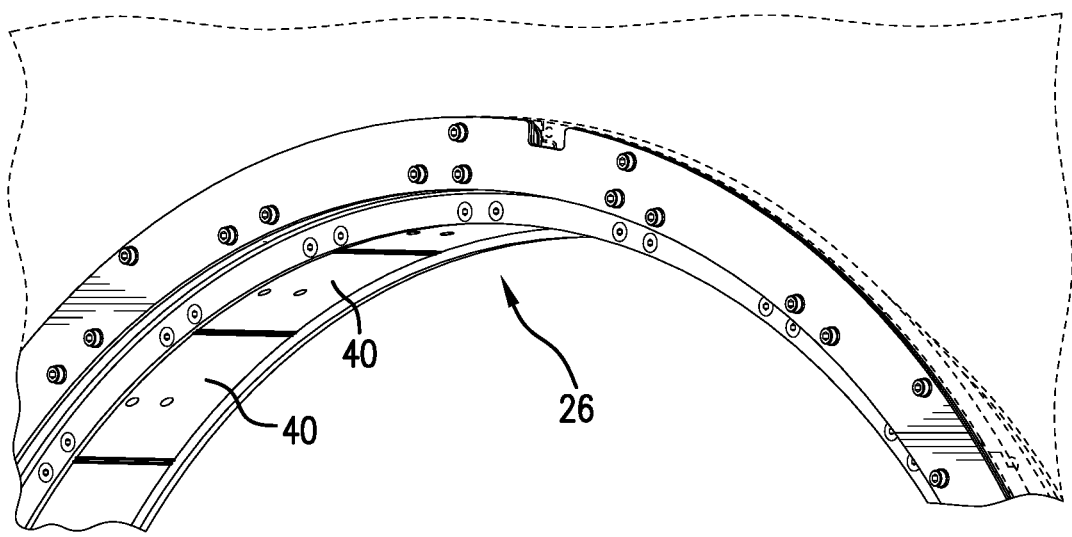
FIGS. 9A-9C are detail views of a gear portion with the guiding, external cerclage and skirt portions of the rotary valve of FIG. 4.
Figure 9B:
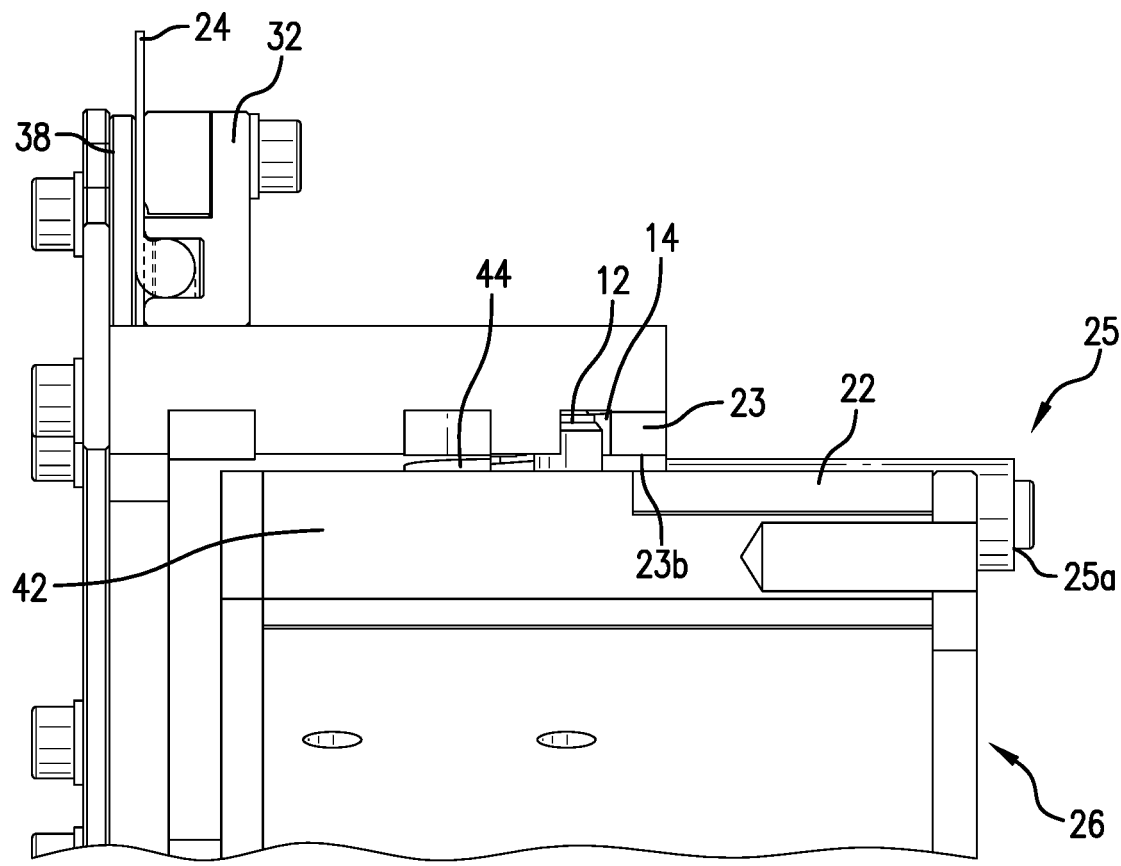
Figure 9C:
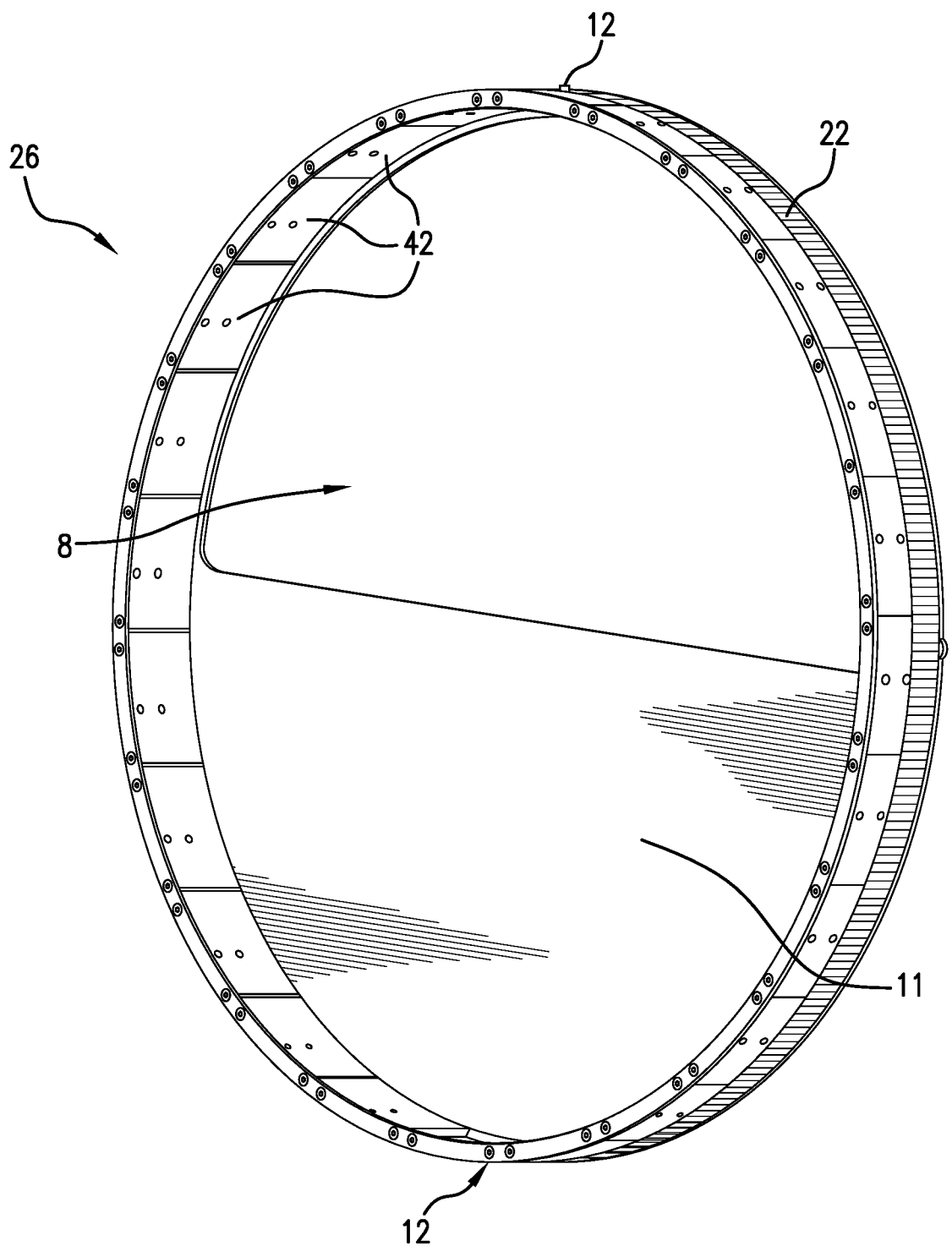

FIGS. 9A-9C show the valve disc assembly 26 engaged with the guide assembly 23 engaged with the internal support ring 32, skirt support 24, and external support 38. As can be seen, the valve disc assembly 26 includes a plurality of gear parts 42 coupled together to form a ring-shaped element, and a valve disc 11 having an opening 8 in one half. Each of the plurality of gear parts 42 includes an outer surface 44 that includes, on at least a portion thereof, gear teeth 22. As previously described, the pinion 20 of the motor 6 engages the gear teeth 22 of the valve disc assembly 26 such that rotation of the pinion rotates the valve disc assembly 26 in a desired direction.

As best seen in FIG. 9B, one of the projections 12 of the valve disc assembly 26 is positioned within groove 14 in the inner surface 23b of the guide assembly 23. As can be seen in FIG. 9C, the valve disc assembly 26 is provided with four projections 12 positioned at 12, 3, 6 and 9 o'clock, respectively, on the valve disc assembly 26. Providing multiple projections 12 and a plurality of rollers 40 (FIG. 8A) ensures smooth rotation and axial movement of the valve disc assembly 26 with respect to guide assembly 23.

Figure 10A:
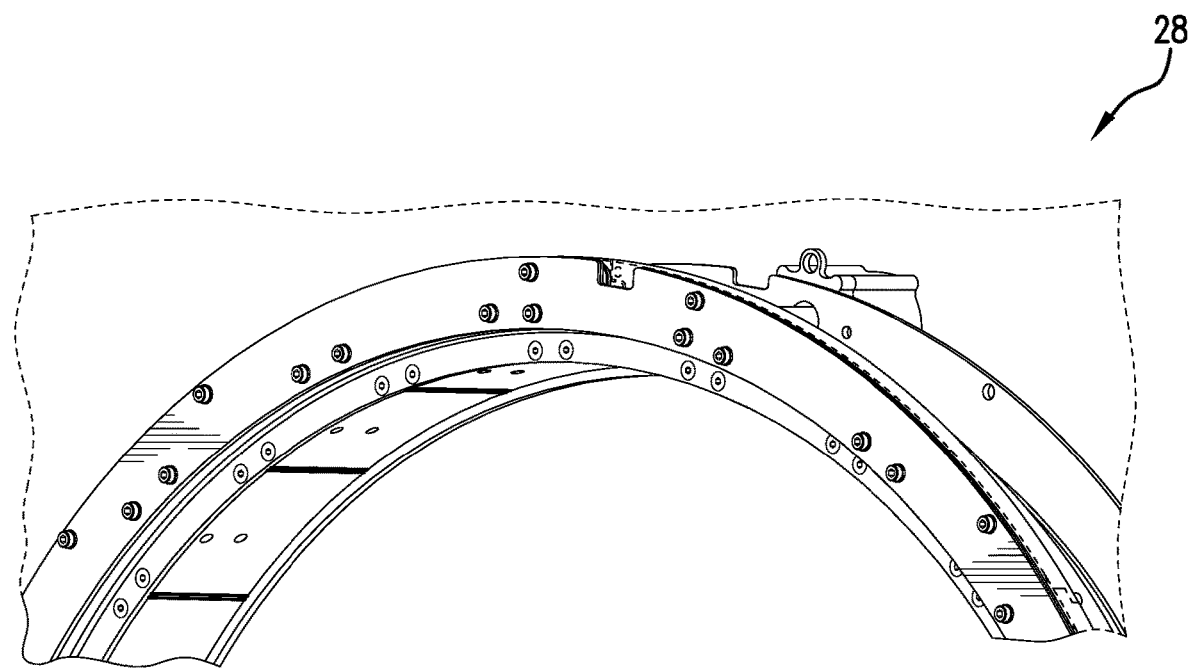
FIGS. 10A-10C are detail, cross-section and isometric views, respectively of the gear portion, guiding portion, external cerclage portion, and skirt portion, of the rotary valve of FIG. 4, coupled to a chimney support.
Figure 10B:
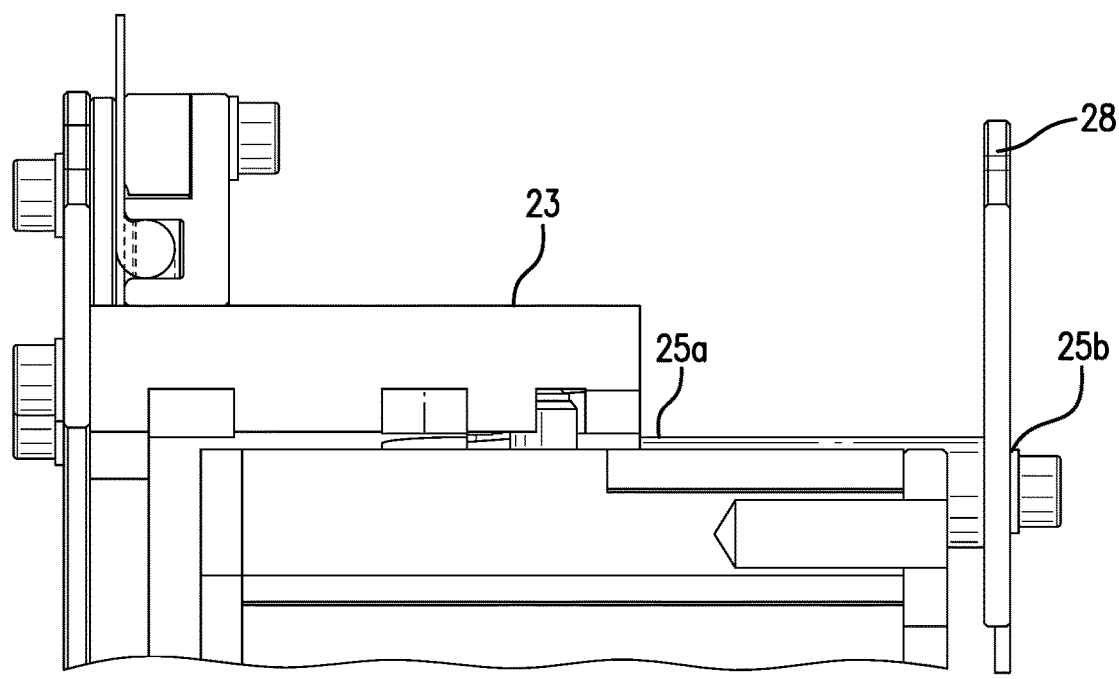
Figure 10C:
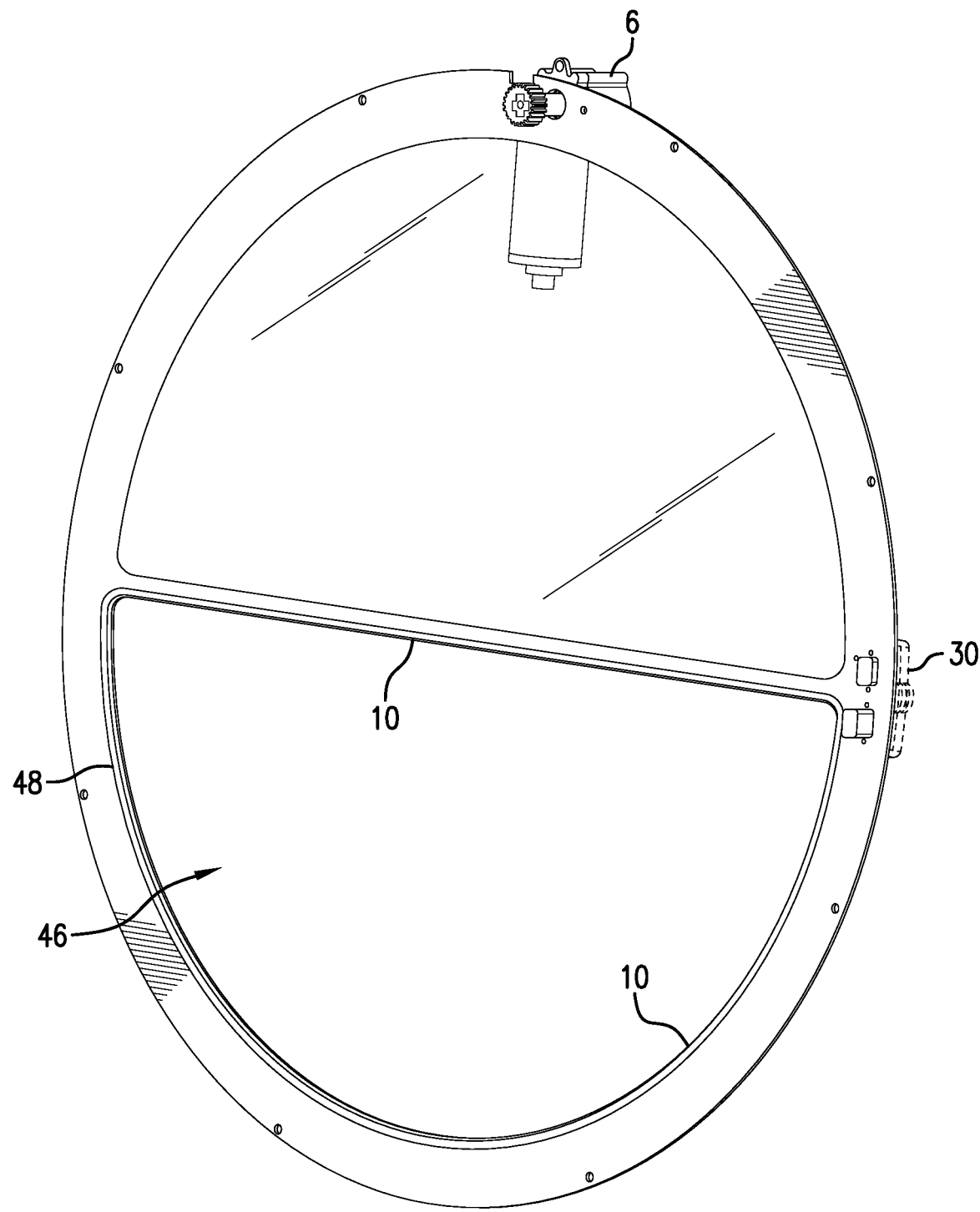

FIGS. 10A-10C show chimney support 28 engaged with the spacer 25 of the guide assembly 23. The chimney support 28 is a circular member that holds the D-shaped flexible seal ring 10 which surrounds an opening 46 that is approximately the same shape and dimension of the opening 8 in the valve disc assembly 26. To receive the flexible seal ring 10, a D-shaped groove 48 is provided in the chimney support 28 surrounding the opening 46. The groove 48 receives and retains a portion of the flexible seal ring 10. In some embodiments the flexible seal ring 10 is glued to the groove 48.

Figure 11A:
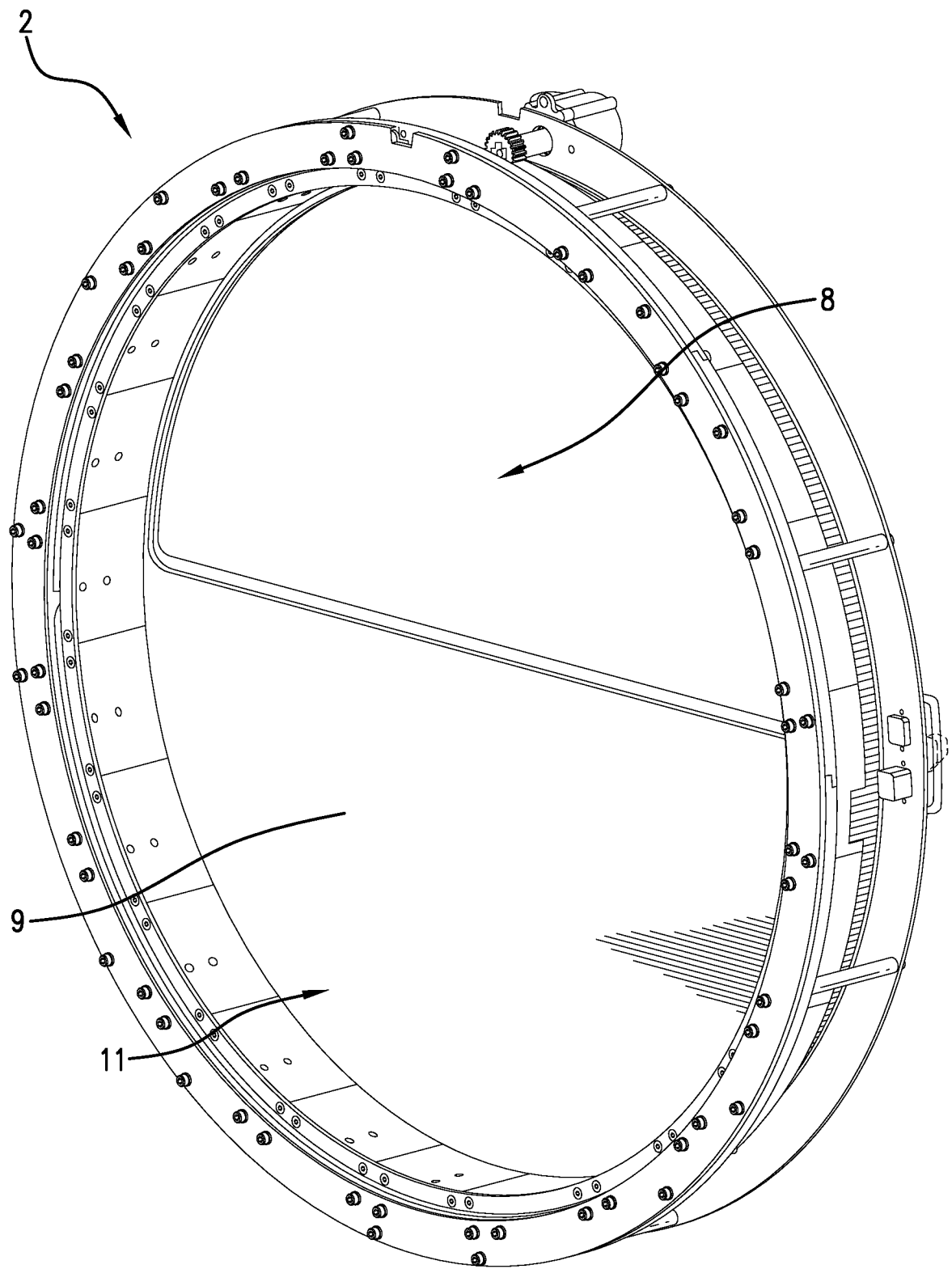
FIGS. 11A-11C are isometric, detail and cross-section views, respectively, of the rotary valve in the closed position of the rotary valve of FIG. 4.
Figure 11B:
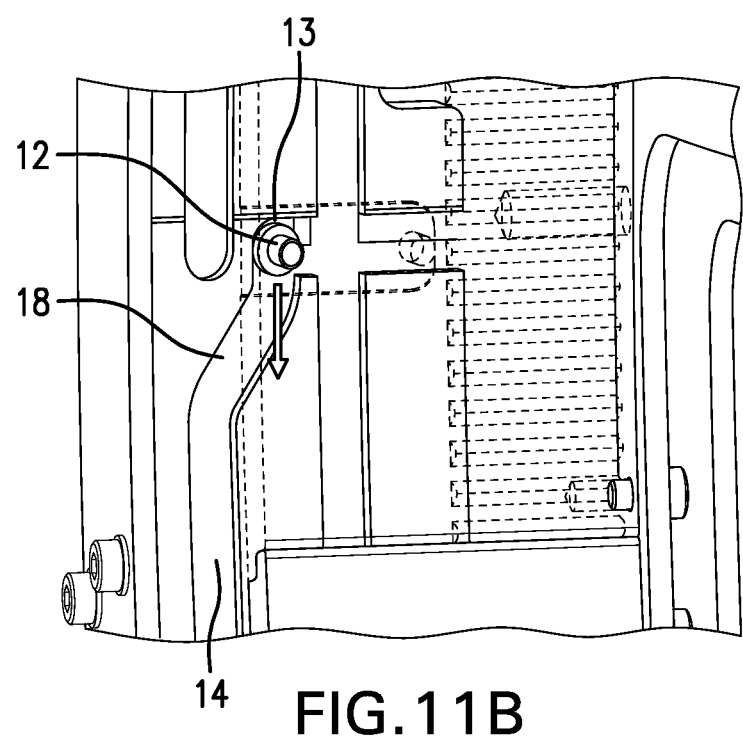
Figure 11C:
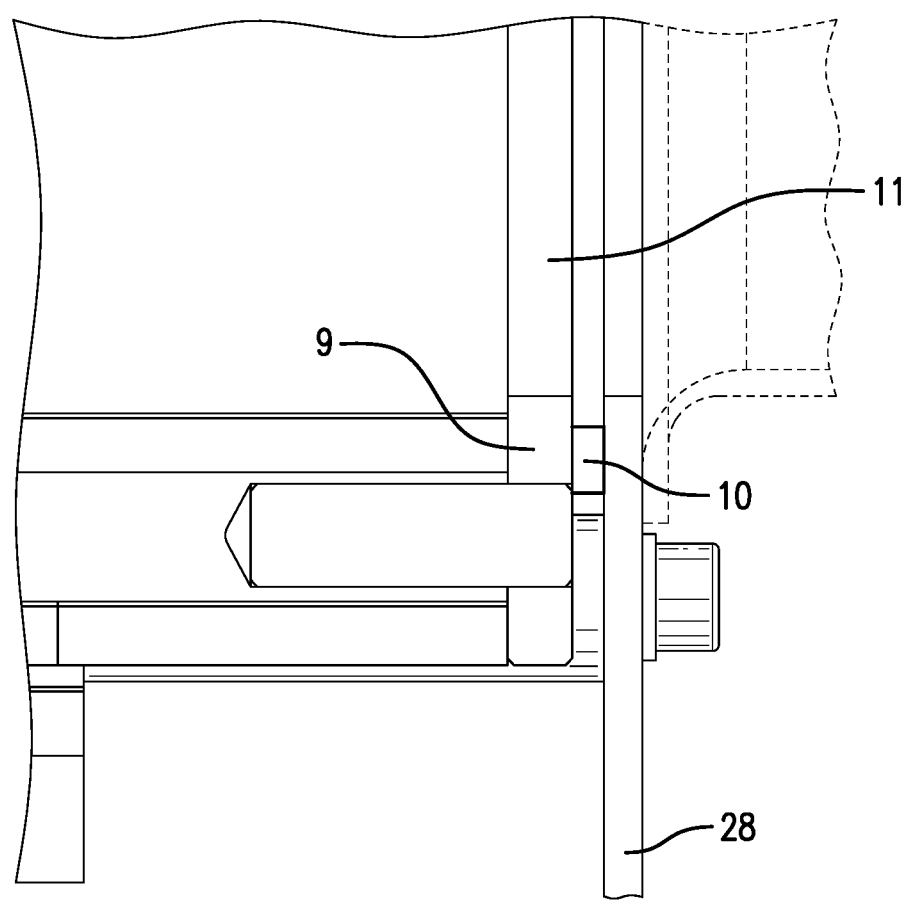

Referring now to FIGS. 11A-11C the rotary disc valve 2 is shown in the closed position. In the closed position the opening 8 in the disc 11 is positioned so that it does not align with the opening 48 in the chimney support 28. As can be seen in FIG. 11C, the seal ring 10 engages the solid portion 9 of the disc 11 so that no flow is allowed through the valve 2. As shown in FIG. 11B, the projection is positioned in the first end 13 of the groove 14 so the valve disc assembly 26 is held tight against the seal.

Figure 12A:
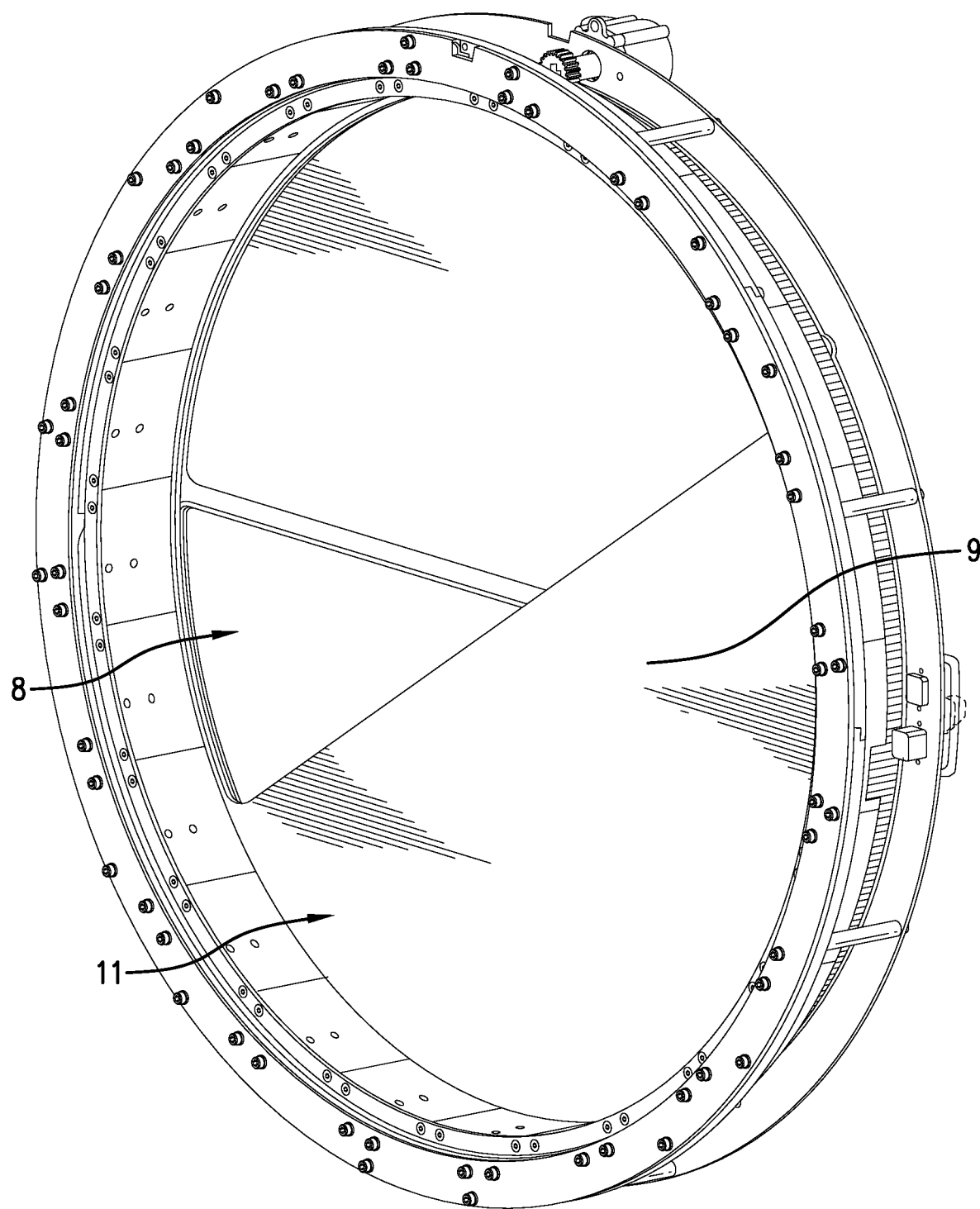
FIGS. 12A-12C are isometric, detail and cross-section views, respectively, of the rotary valve of FIG. 4 as the disc is translating for seal decompression.
Figure 12B:
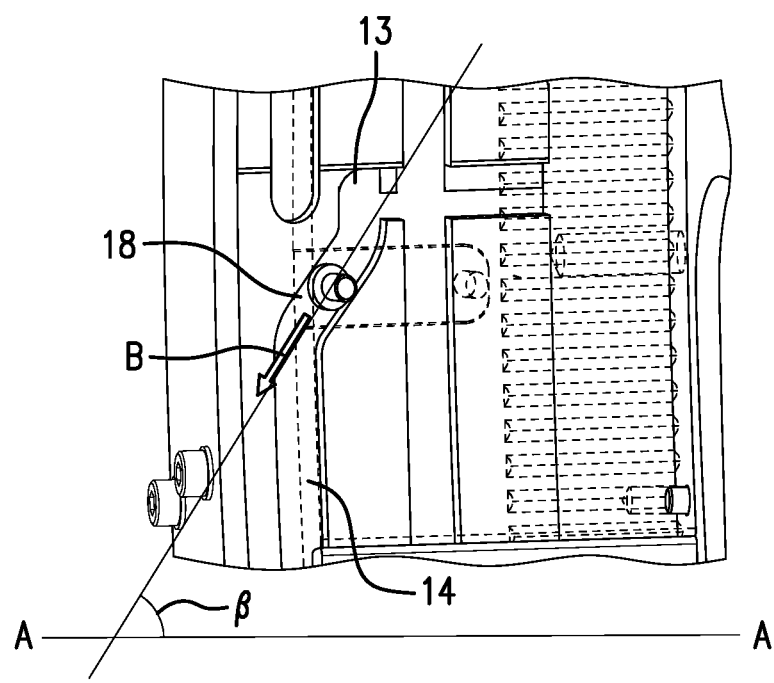
Figure 12C:
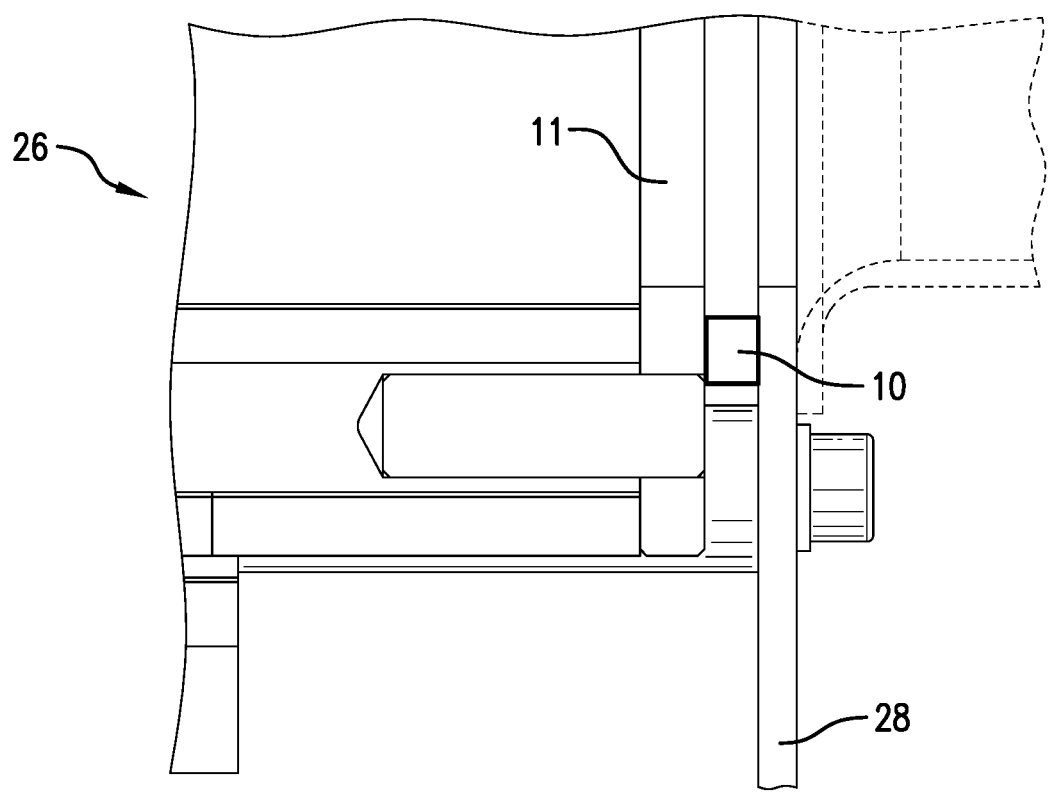

FIGS. 12A-12C show the valve 2 as it is starting to move toward the open position. The pinion 20 of the motor 6 engages and rotates the teeth 22 of the gear parts 42 which rotates the valve disc assembly 26, including valve disc 11, toward the open position. The projection 12 slides within the angled portion 18 of the groove. The angled portion 18 of the groove forms an oblique angle β with respect to the longitudinal axis A-A of the valve 2 so that as the disc assembly 26 rotates, the projection 12 slides within the angled portion 18 of the groove and the disc assembly 26 moves in the direction of arrow "B". As will be appreciated, as the disc assembly 26 rotates, a component of its motion is parallel to the longitudinal axis A-A of the valve 2, which moves the disc assembly away from the chimney support 28 and the seal 10, thus decompressing the seal.

Figure 13A:
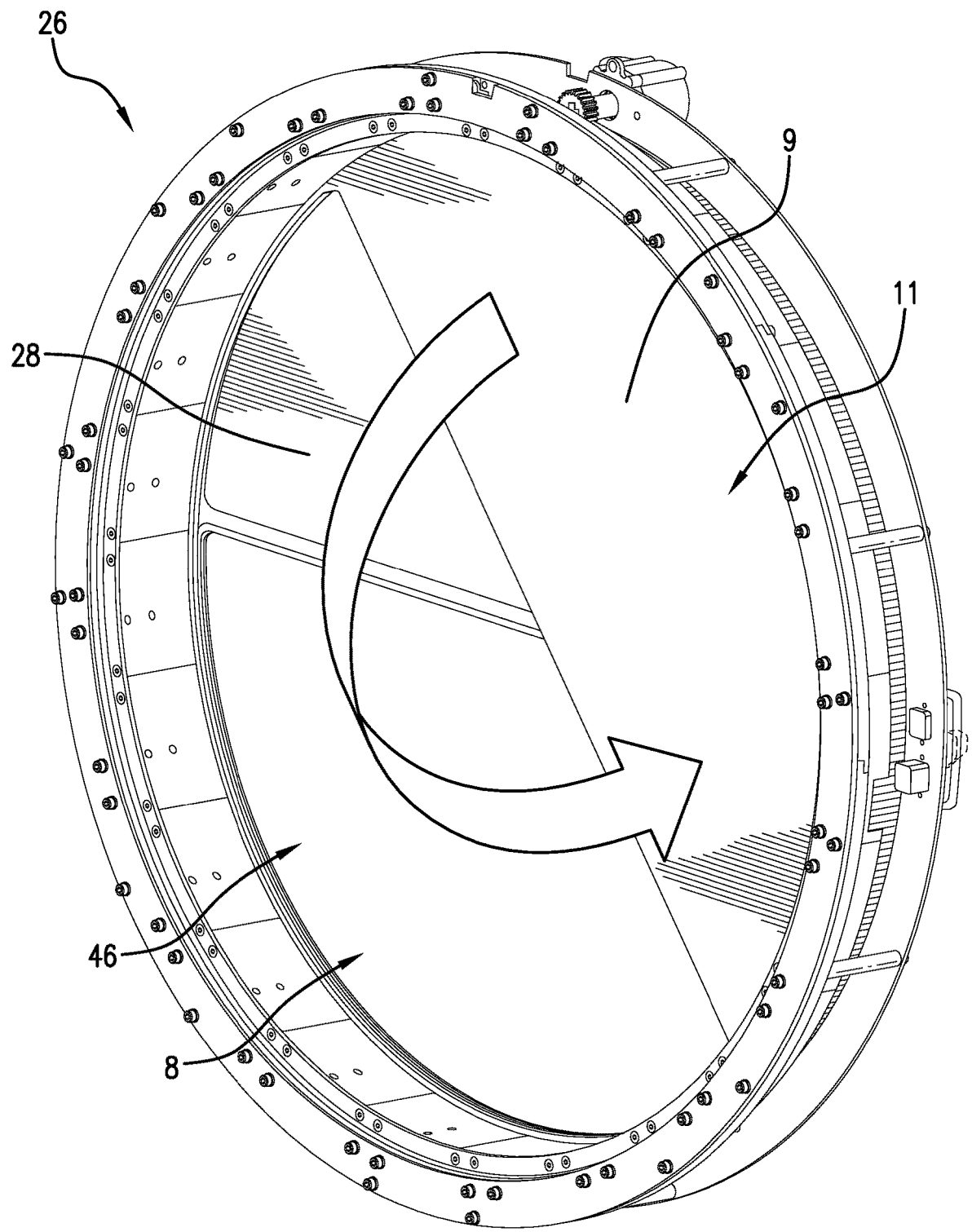
FIGS. 13A-13C are isometric, detail and cross-section views, respectively, of the rotary valve of FIG. 4 as the valve disc is rotating.
Figure 13B:
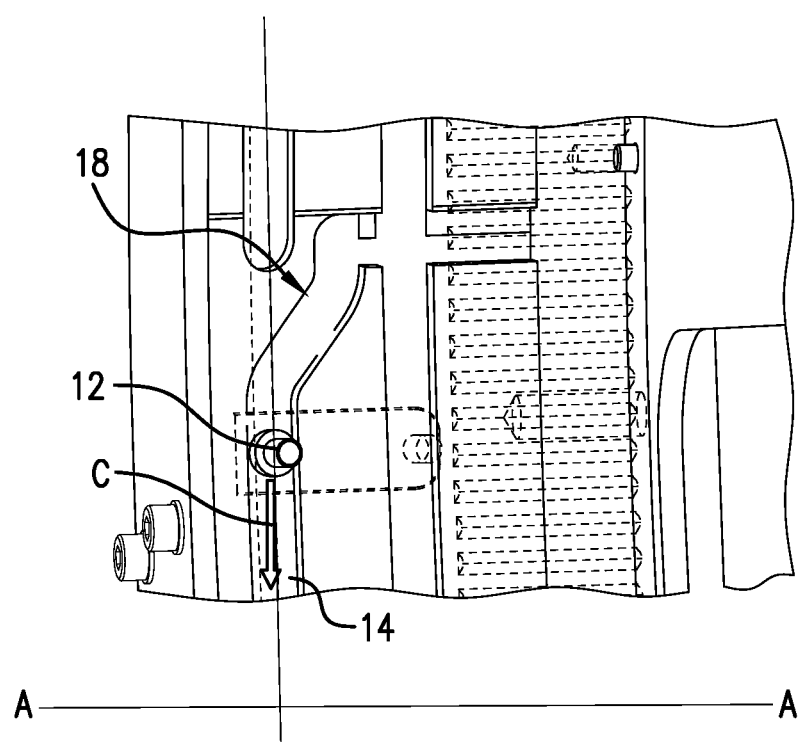
Figure 13C:
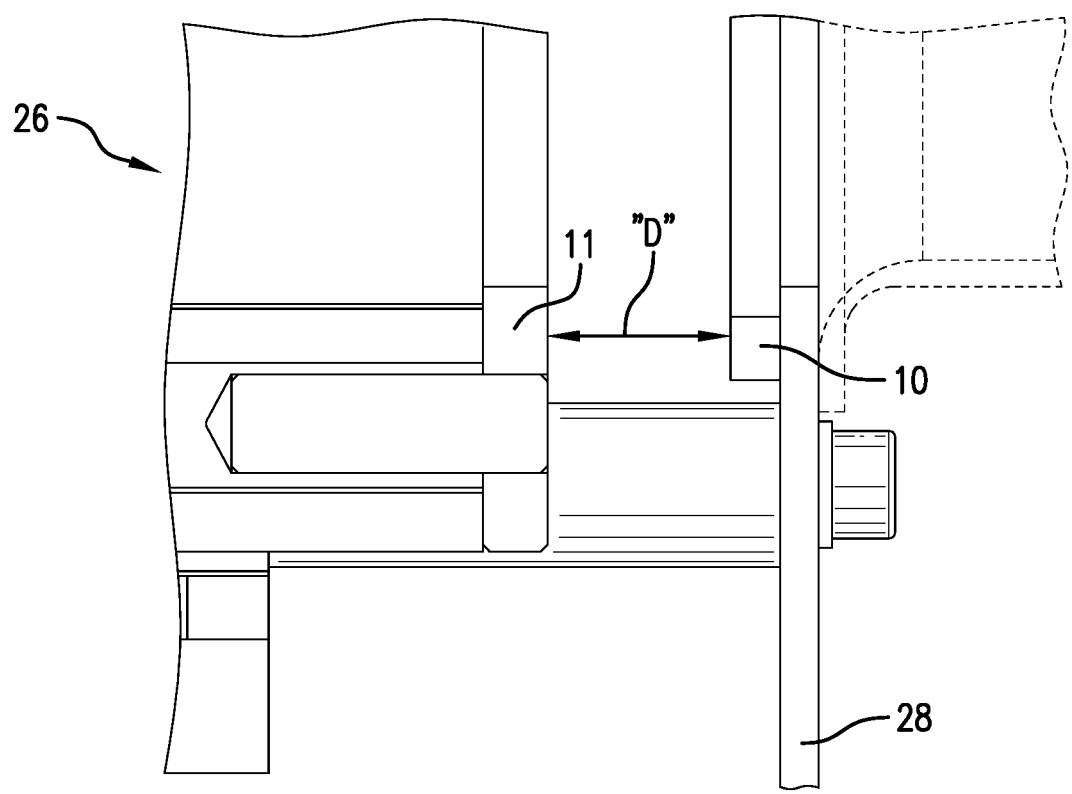

FIGS. 13A-13C show the valve as the valve disc continues to rotate to the open position. As the motor 6 continues to rotate the pinion 20, the teeth 22 of the gear parts 42 continue to rotate the valve disc assembly 26 toward the open position. As can be seen, the projection 12 exits the angled portion 18 of the groove 14 and enters the main portion of the groove, moving in the direction of arrow "C", which is oriented perpendicular to the longitudinal axis A-A of the valve. In this position the valve disc 11 is offset from the seal 10 by a distance "D" (FIG. 13C). In one example embodiment this distance "D" is about 14 millimeters (mm).

Figure 14A:
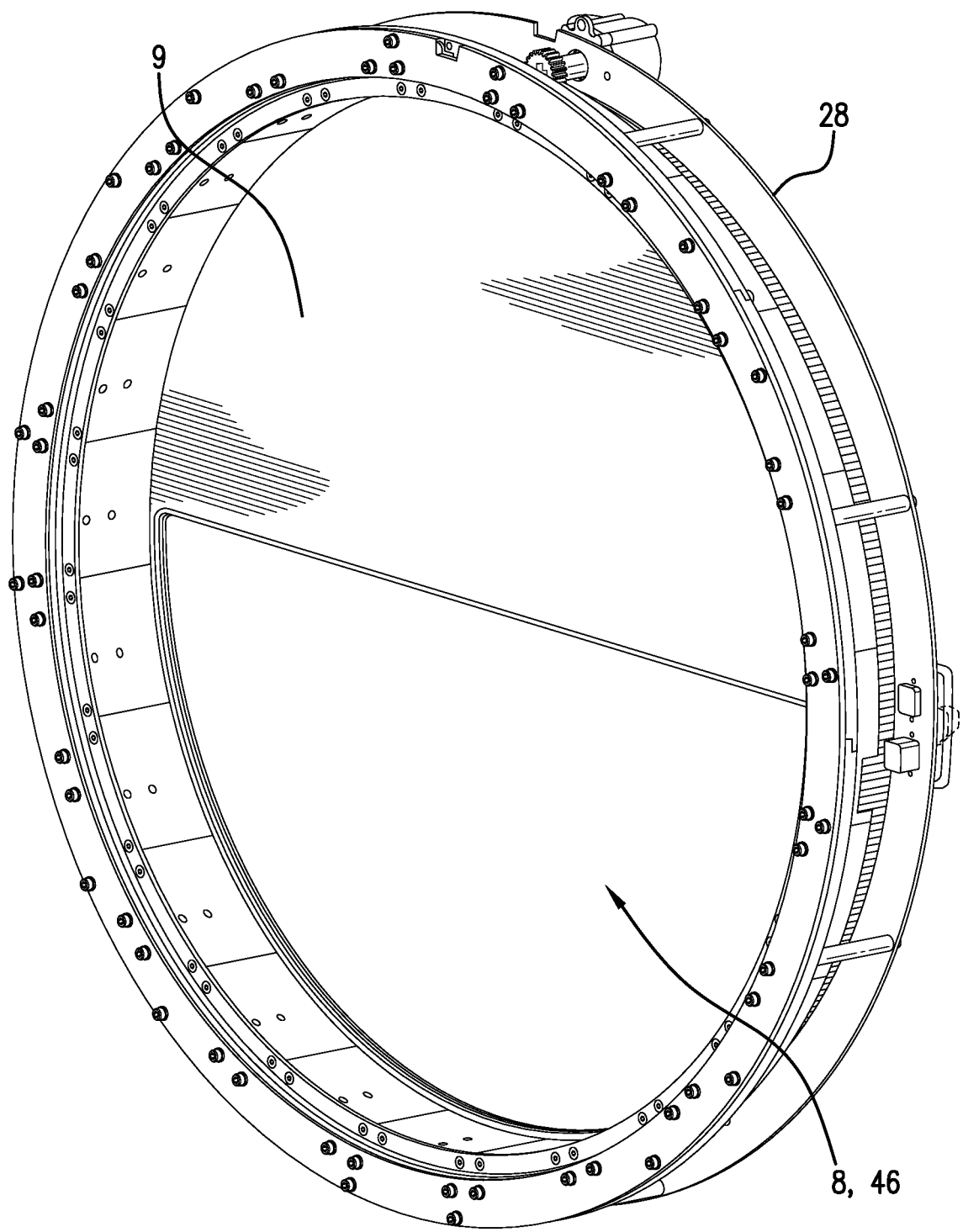
FIGS. 14A-14E are isometric and detail views of the rotary valve of FIG. 4 in the open and closed positions.
Figure 14B:
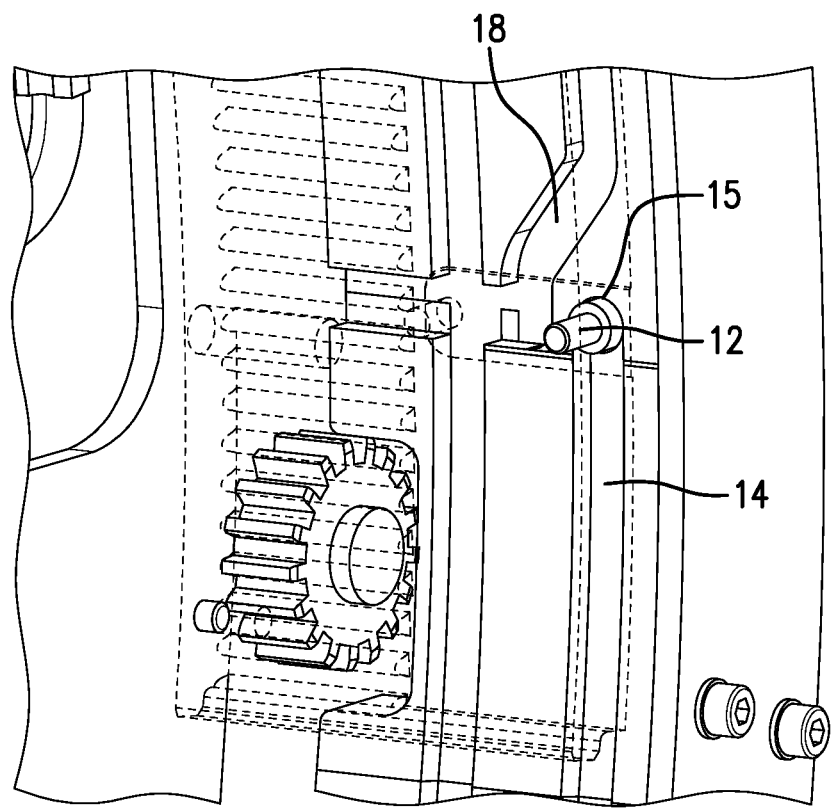
Figure 14C:
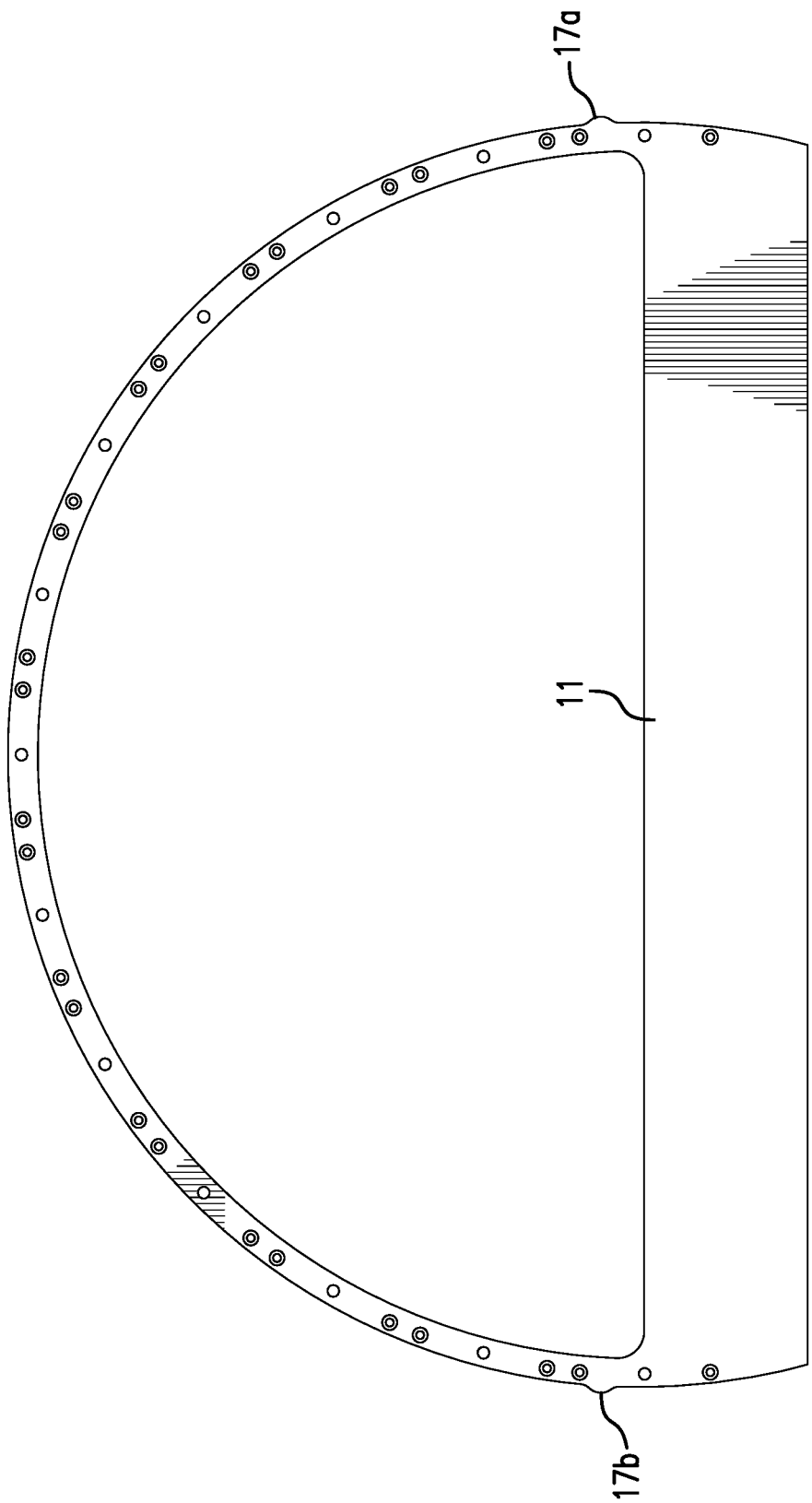

Rotation continues until the opening 8 in the disc 11 begin aligns with the opening 46 in the chimney support 28, as shown in FIGS. 14A-14C. The valve disc 11 includes a pair of radially extending projections 17a, b disposed on opposite sides of the disc (see FIG. 14C) and are configured to interact with first and second sensors 31, 33 (see FIGS. 14D-E) of the switch assembly 30. In the closed position a first one of the projections 17a is engaged with the first sensor 31.

Figure 14D:
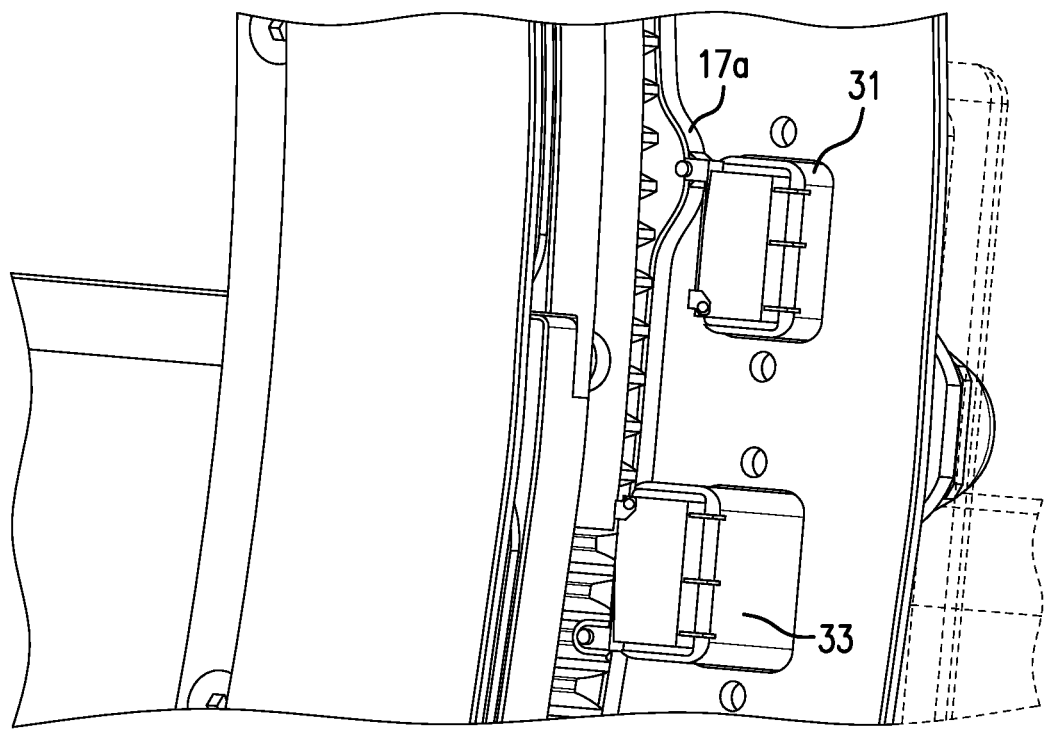
Figure 14E:
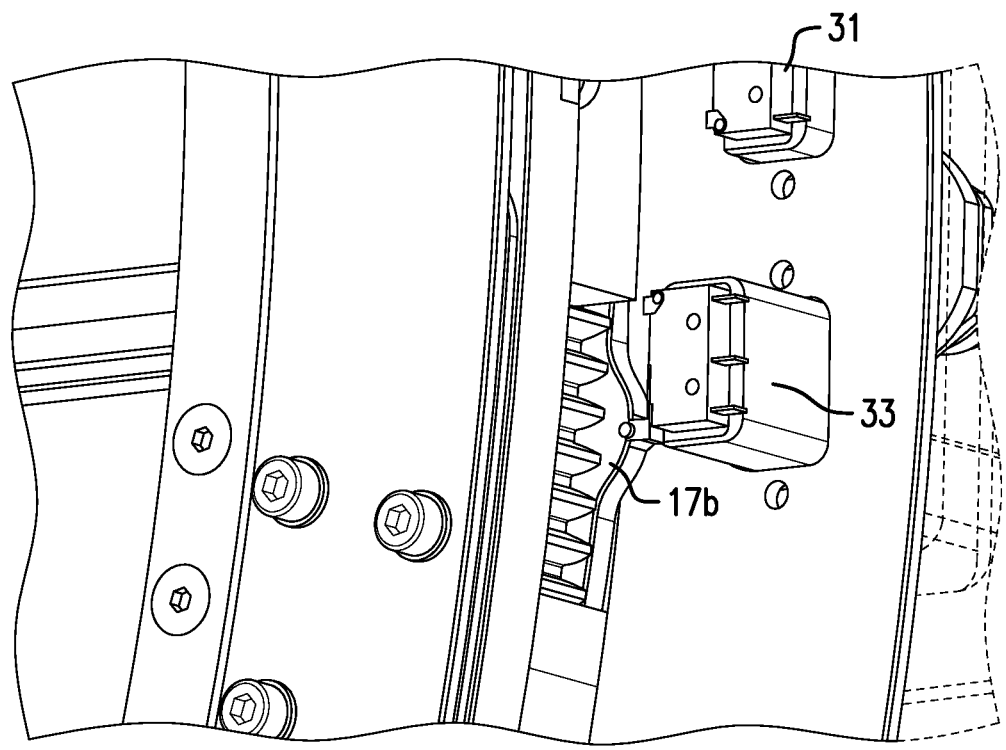

Referring to FIGS. 14D-E, as the valve disc assembly 26 rotates from the closed position toward the open position, the first projection 17a disengages the first sensor 31, and the valve disc assembly continues to rotate (via interaction with the pinion 20) until the second one of the projections 17b engages the second sensor 33. The switch assembly 30 signals the motor to stop rotating the pinion 20. Thus, in the open position the second projection 17b is engaged with the second sensor 33. To close the valve, the valve disc assembly 26 is rotated (again, via interaction with the pinion 20) toward the closed position such that the second projection 17b disengages the second sensor 33. The valve disc assembly continues to rotate until the first projection 17a engages the first sensor 31, whereupon the switch assembly 30 signals the motor to stop rotating the pinion 20.

In the illustrated closed position, the projection 12 is received within the second end 15 of the groove 14. As will be appreciated, grooves 14 (two positioned at 180° and two others at 90° offset by, for example, 14 mm) are provided in the guide assembly 23, one associated with each of the two projections 12 provided in the valve disc assembly 26.

Figure 15A:
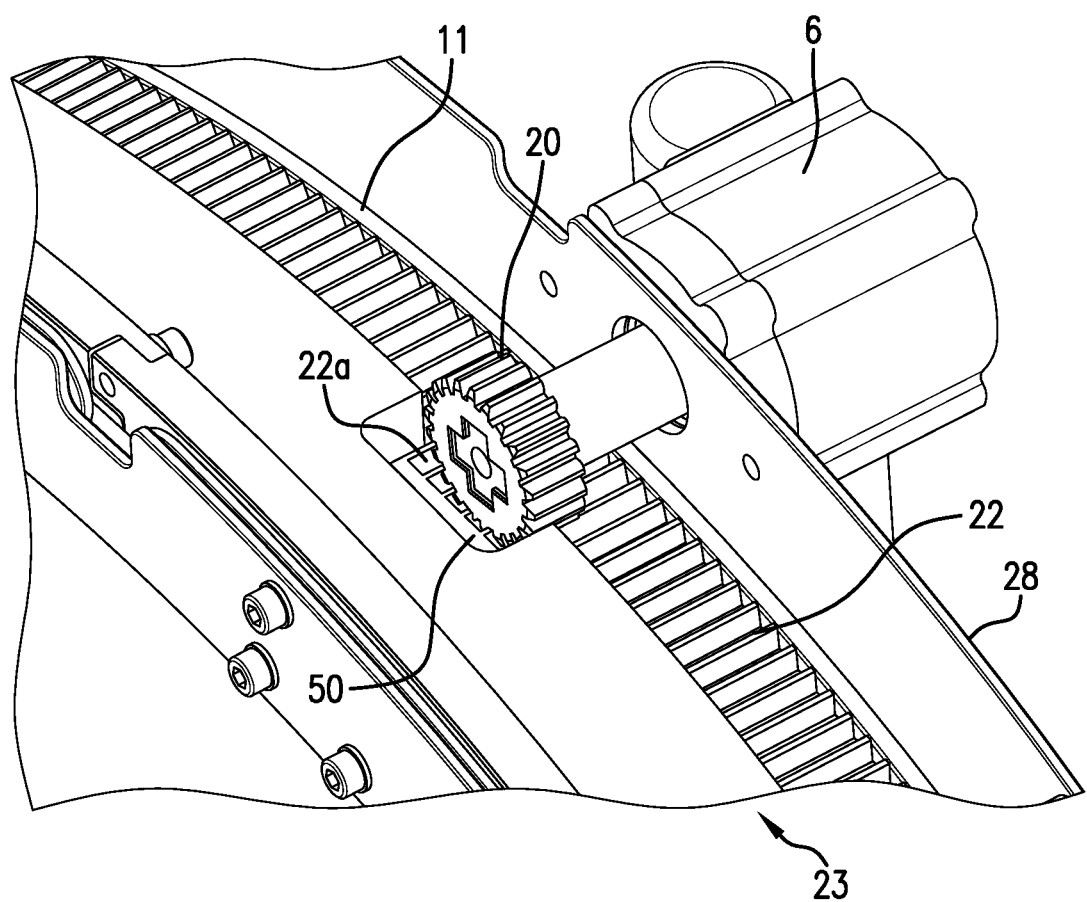
FIGS. 15A and 15B are first and second isometric views of the motor and valve gear in the closed and open positions of the rotary valve of FIG. 4, respectively.
Figure 15B:
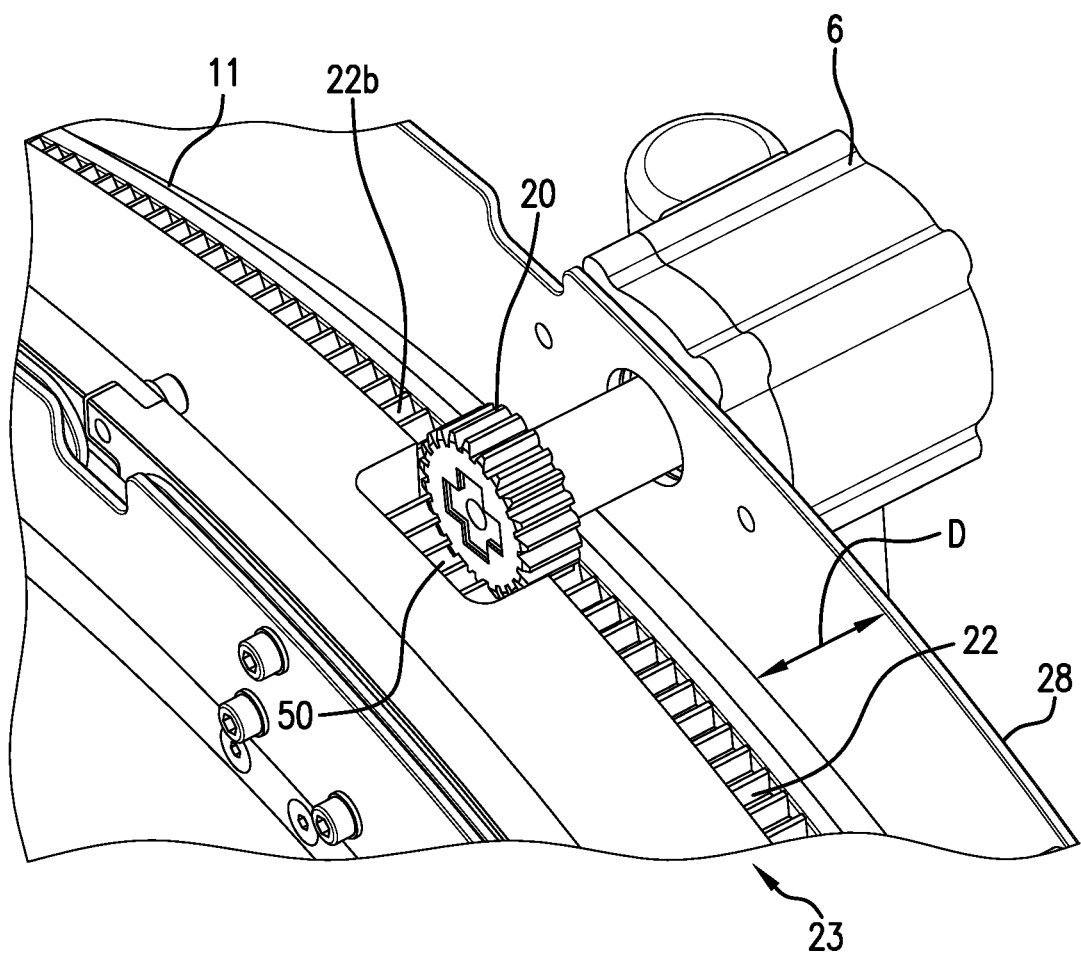

FIGS. 15A-15BC shows the relative positions of the motor and pinion and the external gearing when the valve is in the closed position (FIG. 15A) and the open position (FIG. 15B). In the closed position, the valve disc 11 is disposed directly adjacent to the chimney support 28 so the seal (not shown) engages the valve disc. The pinion 20 can be seen engaging a first lateral portion 22a of the teeth 22 of the gear parts. A recess 50 in the guide assembly 23 receives at least a portion of the pinion.

In the open position shown in FIG. 15B, the valve disc 11 is separated from the chimney support 28 by distance "D", which as previously mentioned can be about 14 mm. In this position the pinion engages a second lateral portion 22b of the teeth 22 of the gear parts.

Thus, with the disclosed arrangement, movement of the valve disc 11 toward and away from the chimney support 28 does not affect the interaction between the pinion 20 and the teeth 22 of the gear parts, and the motor 6 and pinion 20 are able to engage and rotate the valve disc assembly 26 through the full range of motion of the valve disc 11 (from closed to open, then from open to closed).

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The phrases "at least one", "one or more", and "and/or", as used herein, are open-ended expressions that are both conjunctive and disjunctive in operation. The terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. All rotational references describe relative movement between the various elements. Identification references (e.g., primary, secondary, first, second, third, fourth, etc.) are not intended to connote importance or priority but are used to distinguish one feature from another. The drawings are for purposes of illustration only and the dimensions, positions, order and relative to sizes reflected in the drawings attached hereto may vary.

What is claimed is:

1. A rotary disc valve, comprising:
   a guide assembly comprising a ring-shaped member having a groove disposed in an inner surface thereof;
   a valve disc assembly rotatably coupled to the guide assembly, the valve disc assembly comprising:
   a valve disc,
   a projection received within the groove of the guide assembly; and a chimney support coupled to the guide assembly, the chimney support including a seal member for selectively sealing against the valve disc;

wherein the groove has a main portion oriented perpendicular to a longitudinal axis of the rotary disc valve, and an angled portion oriented at an oblique angle with respect to the longitudinal axis; and wherein when the rotary disc valve is moved from a closed position toward an open position the valve disc assembly is rotated in a first direction with respect to the guide assembly, which moves the projection along the angled portion of the groove, thereby moving the valve disc away from the seal to decompress the seal; and wherein when the valve disc assembly is moved from the open position to the closed position the valve disc assembly is rotated in a second direction with respect to the guide assembly, which moves the projection along the angled portion of the groove, thereby moving the valve disc toward the seal to compress the seal.

2. The rotary disc valve of claim 1, wherein the angled portion of the groove is positioned adjacent to a first end of the groove.

3. The rotary disc valve of claim 2, wherein the main portion of the groove is positioned between the angled portion and a second end of the groove.

4. The rotary disc valve of claim 1, wherein when the rotary disc valve is in the closed position the seal engages the valve disc, and wherein when the rotary disc valve is in the open position the seal is disposed a distance "D" away from the valve disc.

5. The rotary disc valve of claim 4, wherein the distance "D" is about 14 millimeters.

6. The rotary disc valve of claim 1, further comprising a skirt support coupled to the guide assembly, the skirt support configured to couple the rotary disc valve to surrounding structure.

7. The rotary disc valve of claim 1, further comprising a chimney support coupled to the guide assembly, the chimney support having an open portion and a solid portion, wherein when the valve is in the open position the open portion of the chimney support aligns with an open portion of the valve disc, and wherein when the valve is in the closed position the solid portion of the chimney support aligns with a solid portion of the valve disc.

8. The rotary disc valve of claim 7, wherein the open portion of the chimney support is D-shaped, and wherein the seal is a D-shaped member coupled to the chimney support around the perimeter of the D-shaped open portion.

9. The rotary disc valve of claim 1, further comprising a motor coupled to the chimney support, the motor including a rotatable pinion, the valve disc assembly comprising a plurality of gear parts, each of the plurality of gear parts having external teeth for engaging the rotatable pinion so that when the motor turns in a first direction the pinion engages the teeth to move the valve disc assembly in a first direction to open the valve, and when the motor turns in a second direction the pinion engages the teeth to move the valve disc assembly in a second direction to close the valve.

10. The rotary disc valve of claim 9, wherein the external teeth of the gear parts comprise first and second lateral portions, and wherein when the rotary disc valve is in the closed position the pinion engages the first lateral portions of the external teeth, and wherein when the rotary disc valve is in the open position the pinion engages the second lateral portions of the external teeth.

11. The rotary disc valve of claim 10, wherein the guide assembly includes a recess for receiving a portion of the pinion when the pinion is engaged with the first lateral portions of the external teeth.

12. The rotary disc valve of claim 1, further comprising a sensor configured to sense a position of the valve disc assembly and for signaling the motor to stop rotating the pinion when the rotary disc valve is determined by the sensor to have moved from the closed position to the fully open position.

13. The rotary disc valve of claim 12, wherein the sensor is further configured to signal the motor to stop rotating the pinion when the rotary disc valve is determined by the sensor to have moved from the closed position to the fully open position.

14. An airship including a plurality of rotary disc valves according to claim 1.

15. The use of a rotary disc valve according to claim 1 as a safety pressure relief valve.

* * * * *